(12) United States Patent
Lynch

(10) Patent No.: US 11,190,757 B2
(45) Date of Patent: Nov. 30, 2021

(54) CAMERA PROJECTION TECHNIQUE SYSTEM AND METHOD

(71) Applicant: Mirage 3.4D Pty Ltd, Sydney (AU)

(72) Inventor: Maryanne Lynch, Elizabeth Bay (AU)

(73) Assignee: Mirage 3.4D Pty Ltd, Sydney (AU)

( * ) Notice: Subject to any disclaimer, the term of this patent is extended or adjusted under 35 U.S.C. 154(b) by 0 days.

(21) Appl. No.: 16/957,053

(22) PCT Filed: Dec. 21, 2018

(86) PCT No.: PCT/AU2018/051395
§ 371 (c)(1),
(2) Date: Jun. 22, 2020

(87) PCT Pub. No.: WO2019/119065
PCT Pub. Date: Jun. 27, 2019

(65) Prior Publication Data
US 2020/0344463 A1 Oct. 29, 2020

(30) Foreign Application Priority Data

Dec. 22, 2017 (AU) .................. 2017905170

(51) Int. Cl.
*G06T 15/00* (2011.01)
*H04N 13/383* (2018.01)
(Continued)

(52) U.S. Cl.
CPC ......... *H04N 13/383* (2018.05); *H04N 13/122* (2018.05); *H04N 13/243* (2018.05); *H04N 13/302* (2018.05)

(58) Field of Classification Search
CPC .. H04N 13/383; H04N 13/243; H04N 13/122; H04N 13/302; H04N 13/286;
(Continued)

(56) References Cited

U.S. PATENT DOCUMENTS 6,753,828 B2 6/2004 Tuceryan et al.
7,086,735 B1 8/2006 Provitola
(Continued)

FOREIGN PATENT DOCUMENTS

WO WO-2005/054231 A1 6/2005
WO WO-2005/091650 A2 9/2005
(Continued)

OTHER PUBLICATIONS

Van Rhijn, A.J. Configurable iput devices for 3D interaction using optical tracking Eindhoven: Technische Universiteit Elndhoven (2007). [retrieved from internet on Jan. 22, 2019]. <URL:https://research.tue.nl/en/pubilcations/configurable-input-devices-for-3d-interaction-using-optical-tracking(8f142821-8dce-4835-bc14-5a8661B37ec3)> Fig. 2.1, p. 14-18.
International Search Report received for PCT/AU2018/051395 dated Feb. 1, 2019.
Search report issued in European Patent Application No. 18892313.0, dated Aug. 10, 2021.

*Primary Examiner* — Howard D Brown, Jr.
(74) *Attorney, Agent, or Firm* — Marshall, Gerstein & Borun LLP

(57) ABSTRACT

An imaging system including: a Camera to maintain a field of view, position, rotation and capture of an image; a Camera Vehicle to transport a camera; a Display Device to output images captured by the camera; a Viewing Space to model a viewer coordinates; a Head unit to model the coordinates of a users eyes, such that the positions of both eyes may be calculated based on the head; an Eye unit to maintain a field of view, position and rotation and calculate the eye plane angles; a Field of View unit to maintain a list of angles, which are used within the display process; a Room Space calculation unit to manage the viewing spaces, viewers, and display devices within a physical space; a Recapture Space unit to place recapture units and render output images for the viewer; a Recapture Space Connections unit to connect the recapture units in the recapture space; a Content Space unit (Continued)

to display a 3D scene; an Image Set unit to maintain the list of images used for the display process; an Output Image Set unit to maintain images to be displayed to the viewer.

8 Claims, 23 Drawing Sheets

(51) Int. Cl.
*H04N 13/302* (2018.01)
*H04N 13/122* (2018.01)
*H04N 13/243* (2018.01)

(58) Field of Classification Search
CPC .. H04N 13/356; H04N 13/296; H04N 13/344; H04N 13/239; H04N 13/366; H04N 13/30; H04N 13/117; H04N 13/289; H04N 2213/001; G06T 15/20; G06T 7/70; G06T 7/80; G02B 30/40; G02B 30/34; G03B 35/00
See application file for complete search history.

(56) References Cited

U.S. PATENT DOCUMENTS

| | | |
|---|---|---|
| 9,380,292 B2 | 6/2016 | McNamer et al. |
| 9,588,341 B2* | 3/2017 | Bar-Zeev ............. G02B 27/017 |
| 2003/0107643 A1 | 6/2003 | Yoon |
| 2013/0113701 A1* | 5/2013 | Sasaki ..................... G06T 19/00 |
| | | 345/156 |
| 2018/0084232 A1* | 3/2018 | Belenkii ............... H04N 13/324 |
| 2018/0268582 A1* | 9/2018 | Schneider ............... G06T 19/20 |
| 2019/0020869 A1* | 1/2019 | Perreault .............. H04N 13/383 |
| 2019/0333288 A1* | 10/2019 | Smet ..................... G06T 19/006 |

FOREIGN PATENT DOCUMENTS

| | | |
|---|---|---|
| WO | WO-2012/054231 A2 | 4/2012 |
| WO | WO-2016/087702 A1 | 6/2016 |

\* cited by examiner

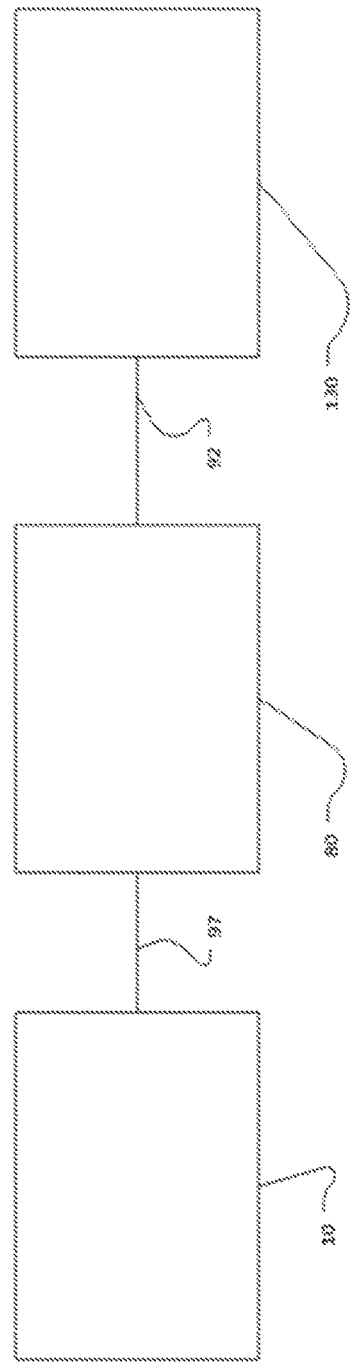

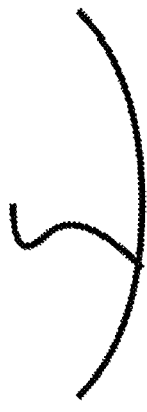
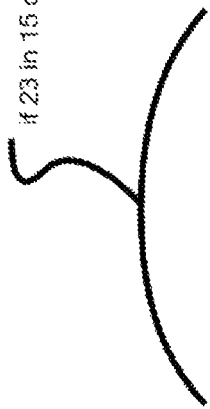
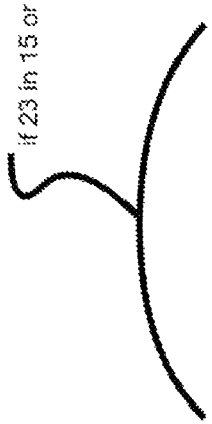
Fig. 27

CAMERA PROJECTION TECHNIQUE SYSTEM AND METHOD

FIELD OF THE INVENTION

The present invention provides for systems and methods for the capture and projection of imagery so as to present depth of field effects.

BACKGROUND OF THE INVENTION

Any discussion of the background art throughout the specification should in no way be considered as an admission that such art is widely known or forms part of common general knowledge in the field.

Camera imaging and projection is a well known field. Example patent application relevant in this field include U.S. Pat. No. 7,086,735 to Provitola, US Patent Publication 2013/0342641 to Morioka et al, U.S. Pat. No. 9,380,292 to McNamer et al, U.S. Pat. No. 9,588,341 to Bar-Zeev et al, and U.S. Pat. No. 6,753,828 to Tuceryan et al. The contents of each of these applications are included by cross reference. US Patent Publication 2013/0113701 to Sasaki, also incorporated herein by cross reference, discloses a free viewpoint viewing system of the prior art. In the Sasaki arrangement, observational errors will occur for closely spaced objects due to the utilisation of a single plane to generate an image (FIG. 4 Sasaki). Even though a viewer has two eyes, the Sasaki process uses just a single plane to use for the left and right eyes. For closely spaced objects, this leads to observational errors.

It would be desirable to provide for individualised camera imaging and projection so as to maintain aspects of depth of field for users on an individual basis.

SUMMARY OF THE INVENTION

It is an object of the invention, in its preferred form to provide for a new form of camera imaging and projection system.

In accordance with a first aspect of the present invention, there is provided an imaging system including: a Camera to maintain a field of view, position, rotation and capture of an image; a Camera Vehicle to transport a camera; a Display Device to output images captured by the camera; a Viewing Space to model a viewer coordinates; a Head unit to model the coordinates of a users eyes, such that the positions of both eyes may be calculated based on the head; an Eye unit to maintain a field of view, position and rotation and calculate the eye plane angles; a Field of View unit to maintain a list of angles, which are used within the display process; a Room Space calculation unit to manage the viewing spaces, viewers, and display devices within a physical space; a Recapture Space unit to place recapture units and render output images for the viewer; a Recapture Space Connections unit to connect the recapture units in the recapture space; a Content Space unit to display a 3D scene; an Image Set unit to maintain the list of images used for the display process; an Output Image Set unit to maintain images to be displayed to the viewer.

In some embodiments, the recapture unit preferably can include a stereo recapture unit to display left and right images on a particular angle, and capturing them upside down and back to front.

The recapture unit further preferably can include a Mono Recapture Unit to display an image on a particular angle, and capturing it upside down and back to front.

In accordance with a further aspect of the present invention, there is provided an imaging system wherein the displayed image is displayed on a display surface, with the viewer's focus point being in front or behind the display surface.

In accordance with a further aspect of the present invention, there is provided a method of displaying an image, wherein the image focus point is parallel to the retina plane of a viewer's eyes.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 1 illustrates a representation of a Camera (110) that produces an output image (111).

FIG. 2 illustrates a representation of a Camera Vehicle (30) used to transport cameras used in the display process.

FIG. 3 illustrates a representation of a Display Device (20), which uses an input image (26) to display on the display surface (23), which has a center point (24).

FIG. 4 illustrates a Viewing Space (10) with a viewer (11) looking through a Display Device (15) into the Content Space (130), focusing on a scene subject (133) centered on the focus point (126).

FIG. 5 illustrates a Room Space (140) when used by multiple viewers with individual viewing spaces.

FIG. 6 illustrates a Content Space (130) comprising of a Camera Vehicle (30) and a scene subject (134).

FIG. 7 illustrates a Content Space (130) for multiple viewers, where each viewer is provided with a Camera Vehicle (e.g. 131).

FIG. 8 illustrates a representation of a Field of View (60) which is used by an Eye (120) and Camera (110).

FIG. 9 illustrates major elements used for the display process, including a Camera Vehicle (30), a Recapture Space (80) and a Viewing Space (10).

FIG. 12 illustrates a top view of a Mono Recapture Unit (50) which uses a center input image (52) to render a output image (57).

FIG. 13 illustrates a side view of a Mono Recapture Unit (50), showing the display height (54) of the recapture display in relation to elements described in FIG. 12.

FIG. 14 illustrates a top view of a Stereo Recapture Unit (40) which uses a left input image (41) and a right input image (42) to render an output image (43).

FIG. 15 shows the recapture display devices (left recapture display (44), right recapture display (45)) overlaid, whereas FIG. 14 shows them side by side for clarity.

FIG. 16 illustrates the Recapture Space (80) configured for the mono display process; the key elements include: the center camera (32), left input recapture unit (81), left output recapture unit (83), viewer's left or current display device (15) and the viewer (11).

FIG. 17 illustrates the Recapture Space (80) configured for the stereo display process; the key elements include: the left camera (31), right camera (33), left input recapture unit (81), left output recapture unit (83), viewer's left or current display device (15) and the viewer (11).

FIG. 18 illustrates the Recapture Space (80) configured for the dual display process; the key elements include: the left camera (31), right camera (33), left input recapture unit (81), right input recapture unit (82), left output recapture unit (83), right output recapture unit (82), viewer's left or current display device (15), viewer's right display device (16), and the viewer (11).

FIG. 19 illustrates the Image Set (100) and the Output Image Set (150) for the Mono Process.

FIG. 20 illustrates the Image Set (100) and the Output Image Set (150) for the Stereo Process.

FIG. 21 illustrates the Image Set (100) and the Output Image Set (150) for the Dual Process.

FIG. 22 is a block diagram illustrating a sub-component of the present invention. FIG. 22 illustrates main and sub elements for the mono process.

FIG. 23 is a block diagram illustrating a sub-component of the present invention. FIG. 23 illustrates main and sub elements for the stereo process.

FIG. 24 is a block diagram illustrating a sub-component of the present invention. FIG. 24 illustrates main and sub elements for the dual process.

FIG. 27 illustrates the examples of display curvature with one embodiment.

DETAILED DESCRIPTION

Figure 1:
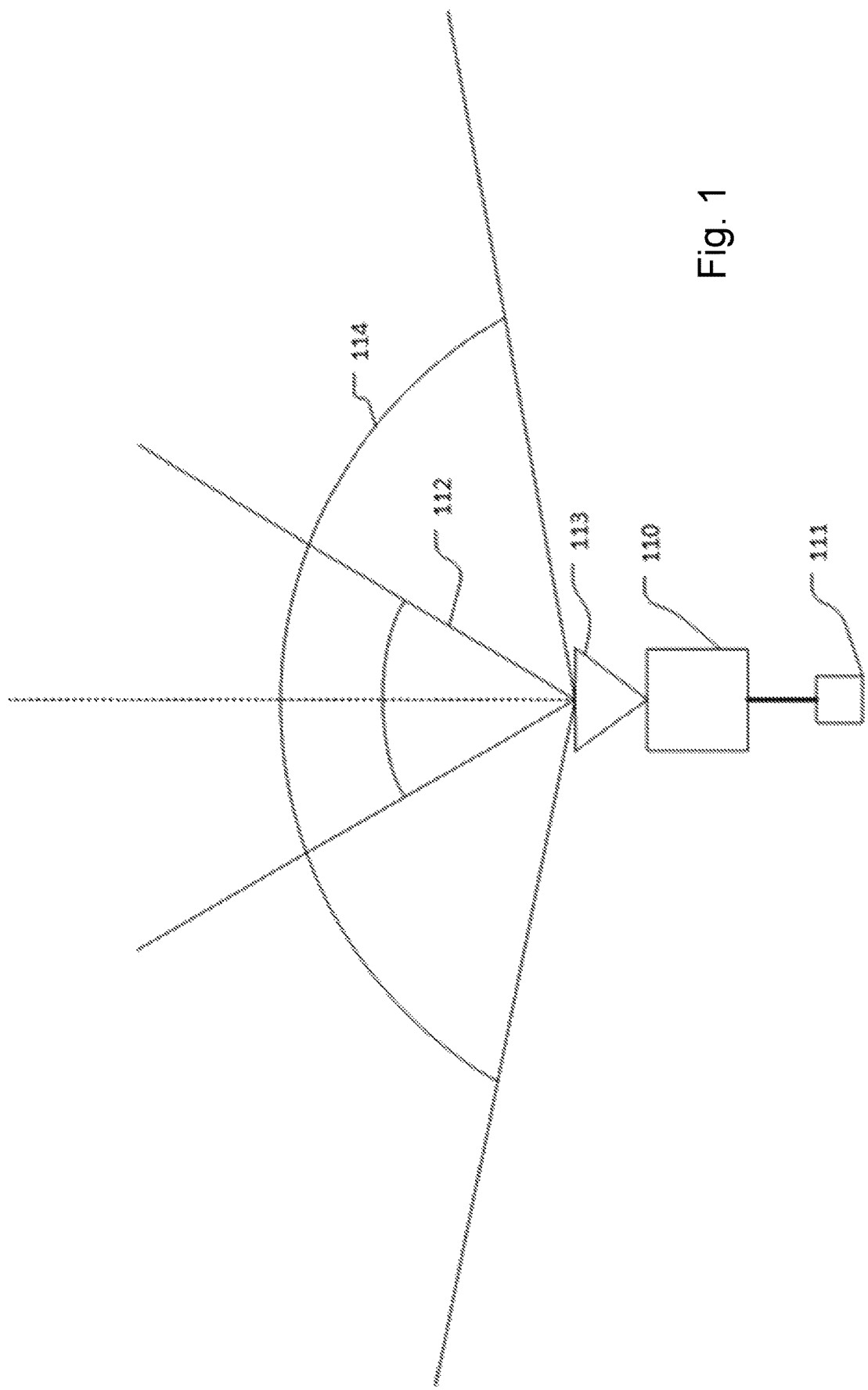
FIG. 1 is a top view of the present invention.

Example embodiments of the present invention relate to camera viewing depths and more specifically it relates to a camera projection technique for displaying imagery on a display surface, with a viewer's focus point being in front or behind the display surface.

An example embodiment of the present invention is directed to a depth which includes, the main elements include: a Camera (110) to maintain a field of view, position, rotation and capture of an image; a Camera Vehicle (30) to transport cameras; a Display Device (20) to output images; a Viewing Space (10) to model viewer(s) coordinates; a Head (70) to model the coordinates of the eyes, such that the positions of both eyes may be calculated based on the head; an Eye (120) to maintain a field of view, position and rotation and calculate the eye plane angles; a Field of View (60) to maintain a list of angles, which are used within the display process; a Room Space (140) to manage the viewing spaces, viewers, and display devices within a physical space; a Recapture Space (80) to place recapture units and render output images for the viewer; a Stereo Recapture Unit (40) to display left and right images on a particular angle, and capturing them upside down and back to front; a Mono Recapture Unit (50) to display an image on a particular angle, and capturing it upside down and back to front; Recapture Space Connections (90) to connect the recapture units in the recapture space; a Content Space (130) to display a 3D scene; an Image Set (100) to maintain the list of images used for the display process; Output Image Set (150) to maintain images to be displayed to the viewer.

There has thus been outlined, rather broadly, some of the features of the camera projection technique in order that the detailed description thereof may be better understood, and in order that the present contribution to the art may be better appreciated. There are additional features of the camera projection technique that will be described hereinafter. In this respect, before explaining at least one embodiment of the camera projection technique in detail, it is to be understood that the camera projection technique is not limited in its application to the details of construction or to the arrangements of the components set forth in the following description or illustrated in the drawings. The camera projection technique is capable of other embodiments and of being carried out in various ways. Also, it is to be understood that the phraseology and terminology employed herein are for the purpose of the description and should not be regarded as limiting.

One potential advantage is to provide a camera projection technique for displaying imagery on a display surface, with the viewer's focus point being in front or behind the display surface.

Another potential advantage is to provide a Camera Projection Technique that provides an image which is parallel to the retina plane of the eyes, not parallel to the display surface.

Another potential advantage is to provide a Camera Projection Technique that produces a off axis, off center projection which is sometimes not possible to create by using matrix projections.

Another potential advantage is to provide a Camera Projection Technique that uses a projection model to provide an analogue of the human eye. The objective is to emulate an image as the eye would see it in real life.

Another potential advantage is to provide a Camera Projection Technique that preserves the spatial integrity of the scene across multiple display surfaces in the viewing space by modeling the dimensions of the display surface(s) and viewer(s).

Another potential advantage is to provide a Camera Projection Technique that when using multiple screens of different sizes, this method renders objects with uniform size.

Another potential advantage is to provide a Camera Projection Technique that provides a stereo or mono view.

Another potential advantage is to provide a Camera Projection Technique that decouples input images from the curvature and resolution of the output display.

Another potential advantage is to provide a Camera Projection Technique that Magnifies zoom without changing the input projection.

1. Overview

Turning now descriptively to the drawings, in which similar reference characters denote similar elements throughout the several views, the figures illustrate an example embodiment.

The main elements include: a Camera (110) to maintain a field of view, position, rotation and capture an image; a Camera Vehicle (30) to transport cameras; a Display Device (20) to output images; a Viewing Space (10) to model viewer(s) coordinates; a Head (70) to model the coordinates of the eyes, such that the positions of both eyes may be calculated based on the head; an Eye (120) to maintain a field of view, position and rotation and calculate the eye plane angles; a Field of View (60) to maintain a list of angles, which are used within the display process; a Room Space (140) to manage the viewing spaces, viewers, and display devices within a physical space; a Recapture Space (80) to place recapture units and render output images for the viewer; a Stereo Recapture Unit (40) to display left and right images on a particular angle, and capturing them upside down and back to front; a Mono Recapture Unit (50) to display an image on a particular angle, and capturing it upside down and back to front; Recapture Space Connections (90) to connect the recapture units in the recapture space; a Content Space (130) to display a 3D scene; an Image Set (100) to maintain the list of images used for the display process; Output Image Set (150) to maintain images to be displayed to the viewer.

2. Viewing Space

Models the coordinates required for a recapture unit to produce an output image.

Figure 4:
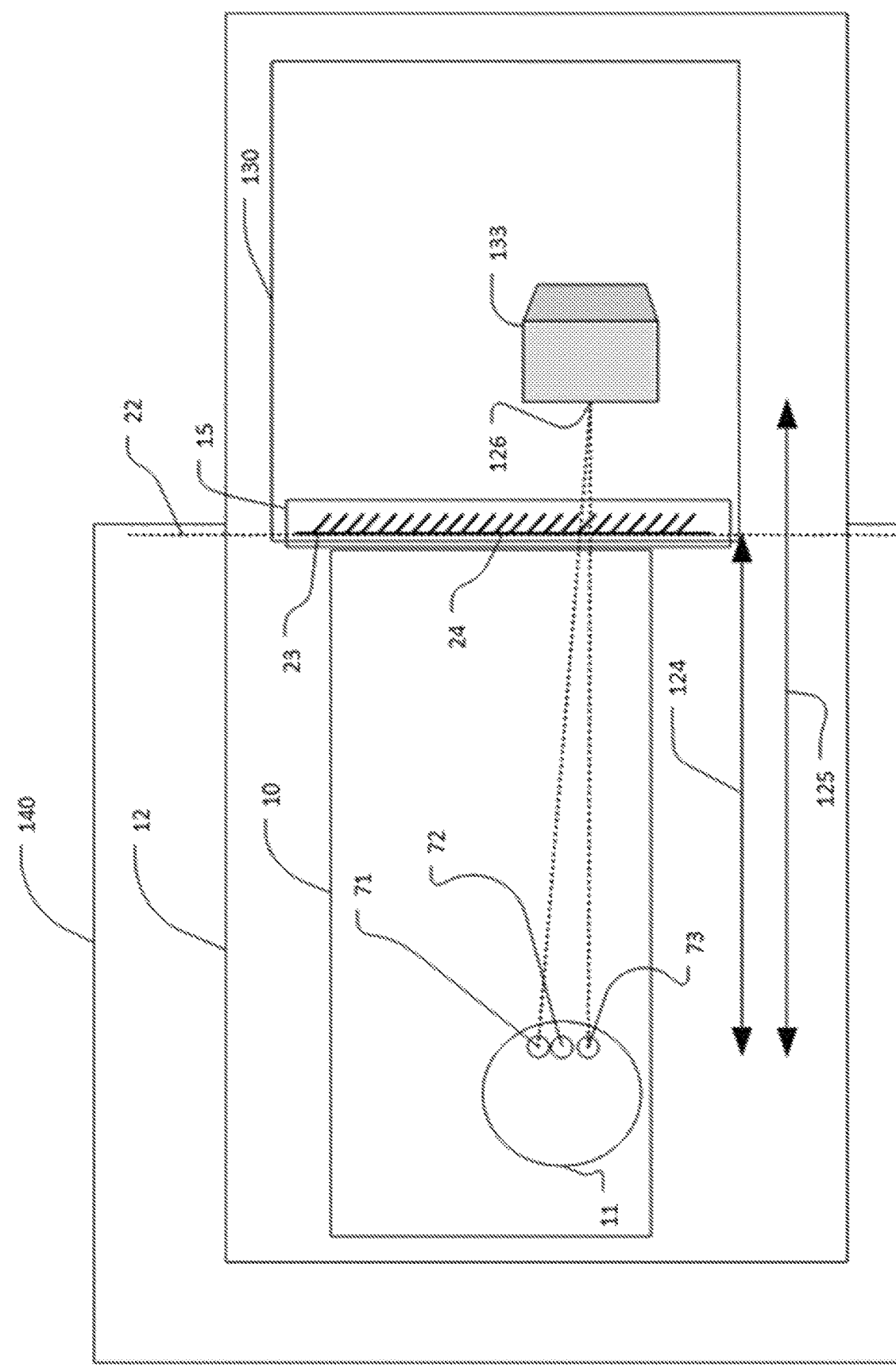
FIG. 4 is a top view of the present invention.

FIG. 4 illustrates a Viewing Space (10) with a viewer encapsulated for the purposes of modeling the viewer(s) coordinates for the Camera Vehicle (30) in the Content Space (130):

The inputs include the Viewer's Head position (70); the position of the left eye (71), center eye (72), right eye (73); the field of view (123); the Eye to display surface distance (124); Focal length (125) and Focus point (126).

The relative coordinates between the viewer (11) and the Display Surface (20) are also supplied to the recapture units in the Recapture Space (80). The center eye (72) is calculated as a position half-way between the viewer's left and right eyes (71 and 73) and is used for the mono display surface.

3. Display Device

Figure 3:
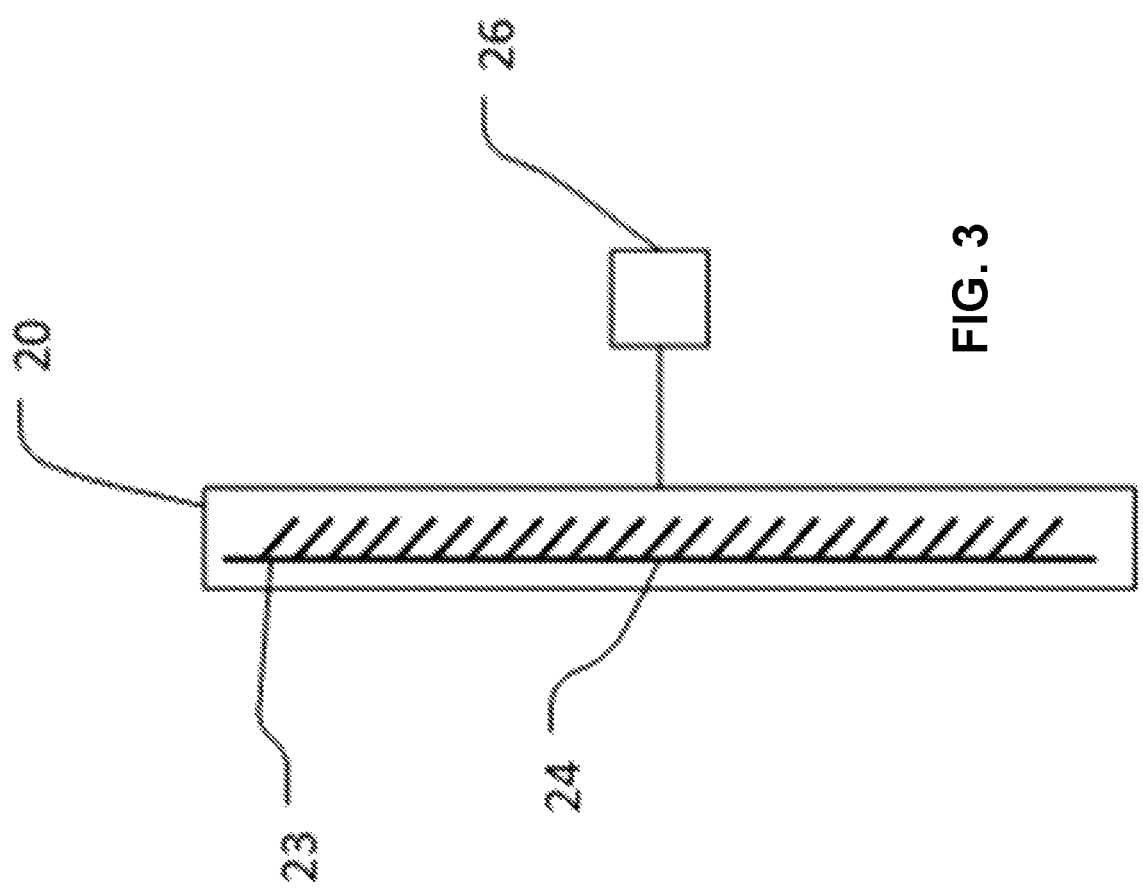
FIG. 3 is a top view of the present invention.

The Display device displays the input image from the output recapture unit and it is placed on the display surface. Turning to FIG. 3, the Display Device (20) displays the input image (26) from the output recapture unit (83 or 84) and it is placed on the display surface (23); such that, when the viewer (11) is at the "eye to display surface distance" (124) away from the Display Device (20), their focal length (125) to the scene subject (133) will be aligned based on their Field of View (60) and the proportional retina display height. (Refer to FIGS. 4 and 8). The height (54) and width (53) of the Display Device (20) are used to set the size of the Field of View (60) for the Camera (110) of the input recapture unit; and it is also used to set the size of the display in the output recapture unit. The Display Device (20) has a display center (24).

4. Camera Vehicle

Figure 2:
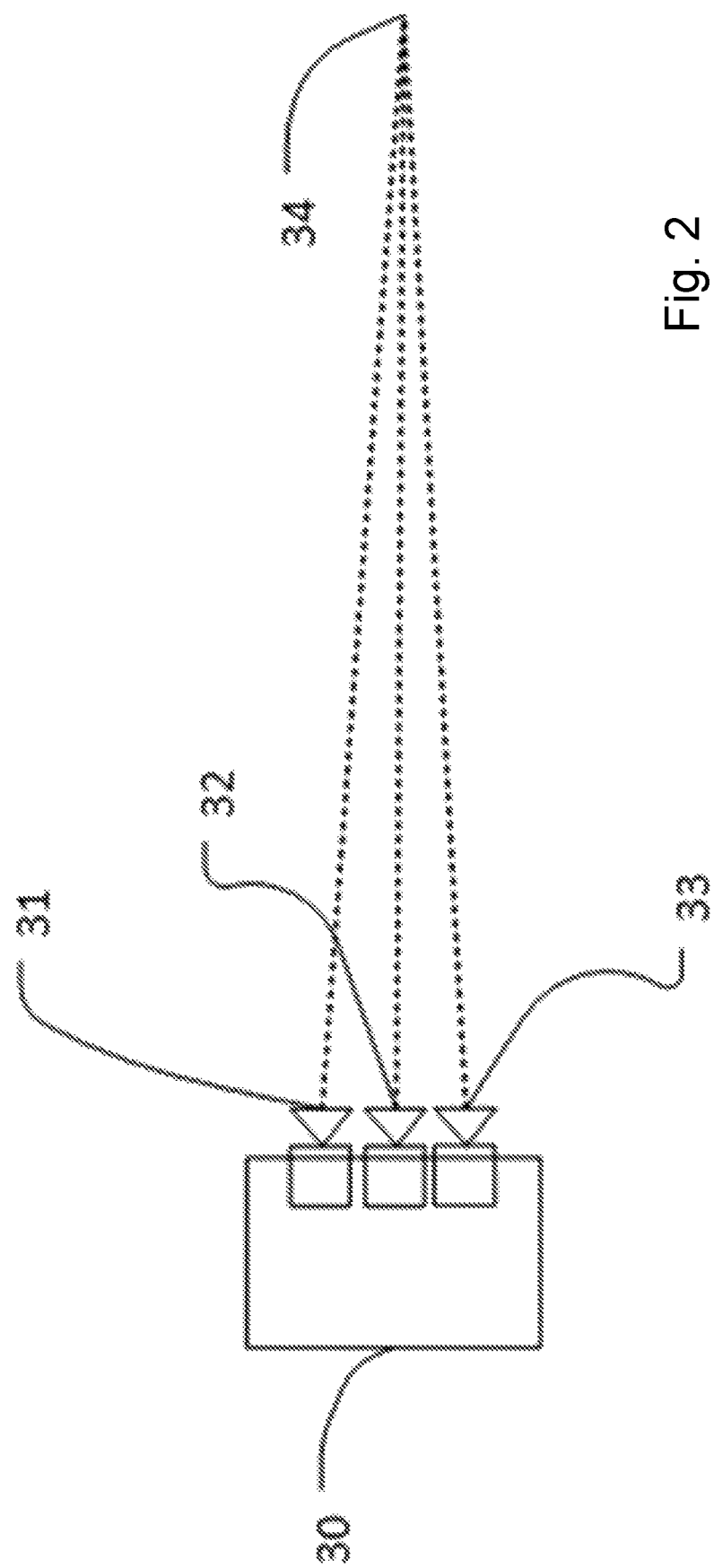
FIG. 2 is a top view of the present invention.

The camera vehicle captures input images for the display process. FIG. 2 illustrates a Camera Vehicle (30) used to transport cameras used to display an image to the viewer. The Camera Vehicle (30) includes a left camera (31), center camera (32), right camera (33) and has a focus point (34).

There can be a number of Structural and Functional Variations, including: 1. Mono—center. 2. Stereo—L&R. A. Physical. B. Virtual.

5. Stereo Recapture Unit

To display left and right images on a particular angle, and capturing them upside down and back to front.

Displays a single output image to a display device, from two input images where the output image is aligned with the screen plane normal; and the input image is aligned with the eye plane normal.

Figure 14:
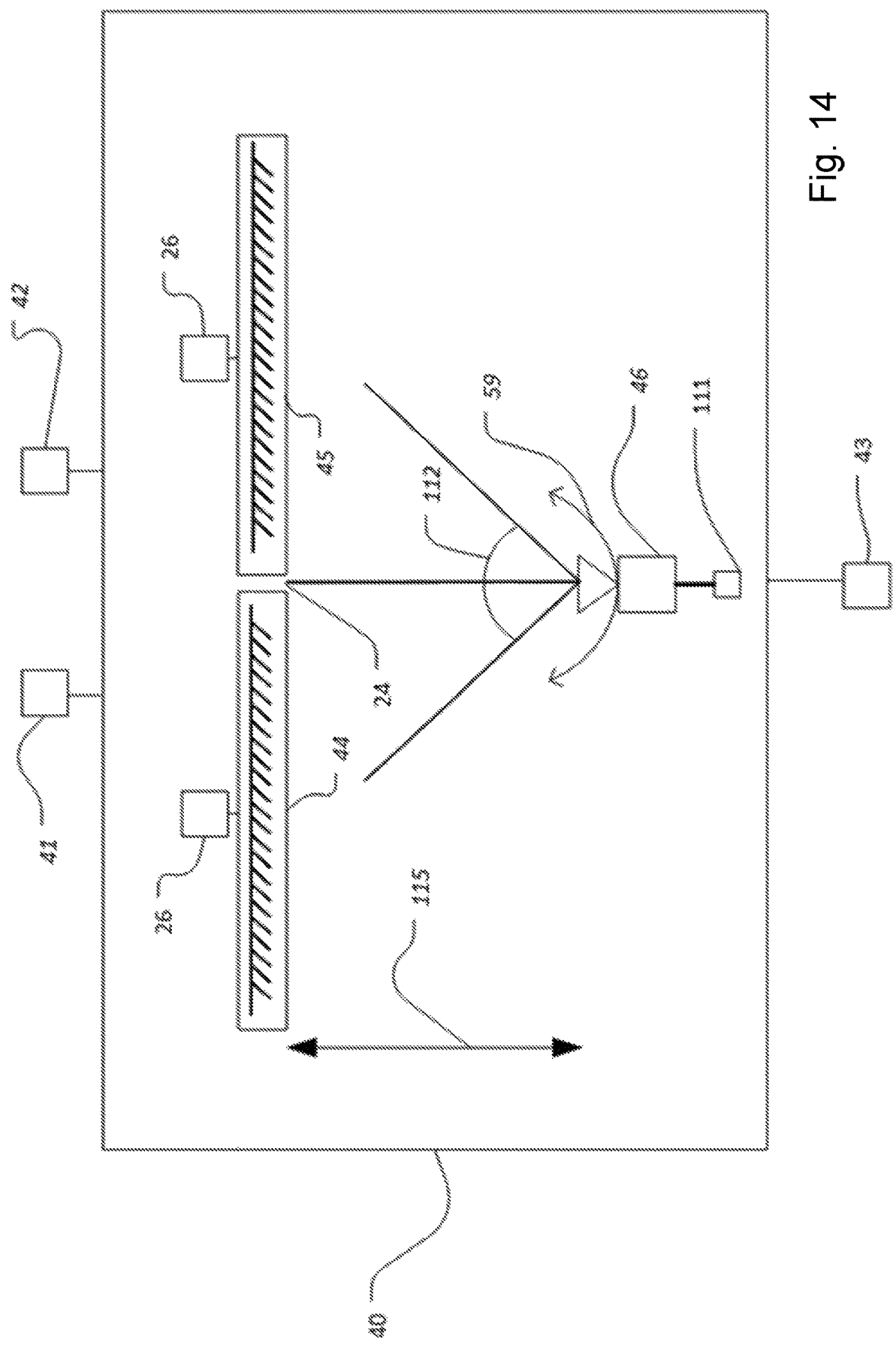
FIG. 14 is a top view of the present invention.

FIG. 14 illustrates a top view of a Stereo Recapture Unit (40) which uses a left input image (41) and a right input image (42) to render an output image (43) which appears flipped horizontally and vertically without requiring any per-pixel processing of the image; and also, blending the left input image (41) with the right input image (42). It is faster than standard flipping mechanisms because it does not require any per-pixel processing of the image. Internally, the Stereo Recapture Unit (40) is comprised of left recapture display (44), right recapture display (45) and a recapture camera (46). The left display (44) is placed at a position equal to the viewer's left eye (71), the right display is placed at a position equal to the viewer's right eye (73) and the recapture camera is placed at a recapture distance (115), on a rotation (59) and using a field of view (112).

Figure 15:
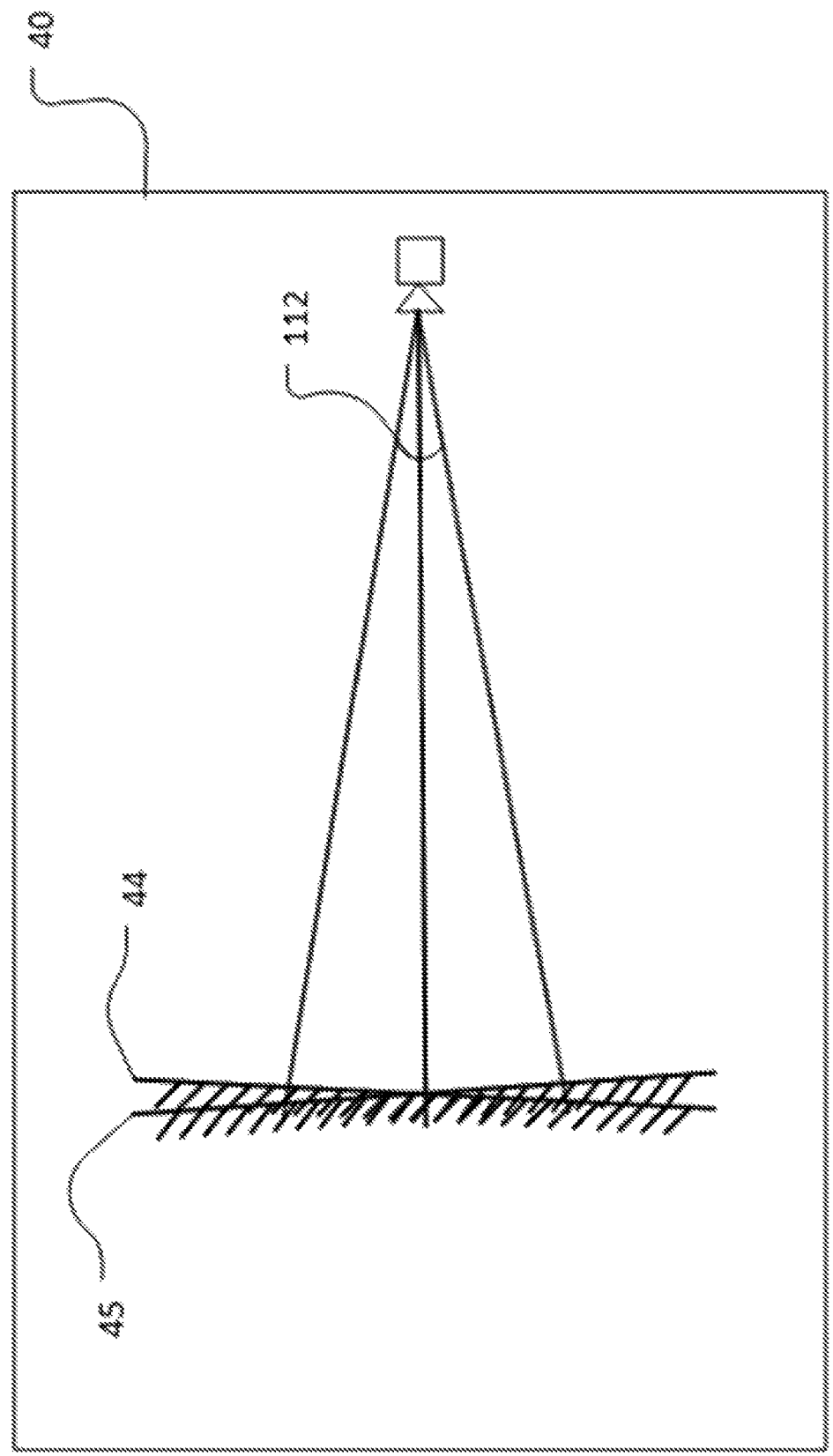
FIG. 15 is a top view of the present invention.

It may operate as a Mono Recapture Unit (40) by using the left input (41) and left display (44) and disabling the right display (45). In mono mode, the right display (45) and right input (42) are not used. This figure illustrates the Stereo Recapture Unit (40) in an inactive mode, so that its parts may be easily identified. When the recapture unit is running, it looks more like FIG. 15. When the recapture unit is running, the value from the left input (41) is assigned to the input image (26) for the left display (44). Likewise, the value from the right input (42) is assigned to the input image (27) for the right display (45). The output image (111) from the recapture camera (46) is assigned to the output image (43) for the Stereo Recapture Unit (40). FIG. 15 shows the recapture display devices (left recapture display (44), right recapture display (45)) overlaid, whereas FIG. 14 shows them side by side for clarity. At runtime, the recapture unit looks more like FIG. 15 than FIG. 14.

Structural and Functional Variations: Default mode (stereo). 2. Mono mode (left input only). 3. Display surface shape.

6. Mono Recapture Unit

The Mono Recapture Unit acts to display an image on a particular angle, and capturing it upside down and back to front.

Figure 12:
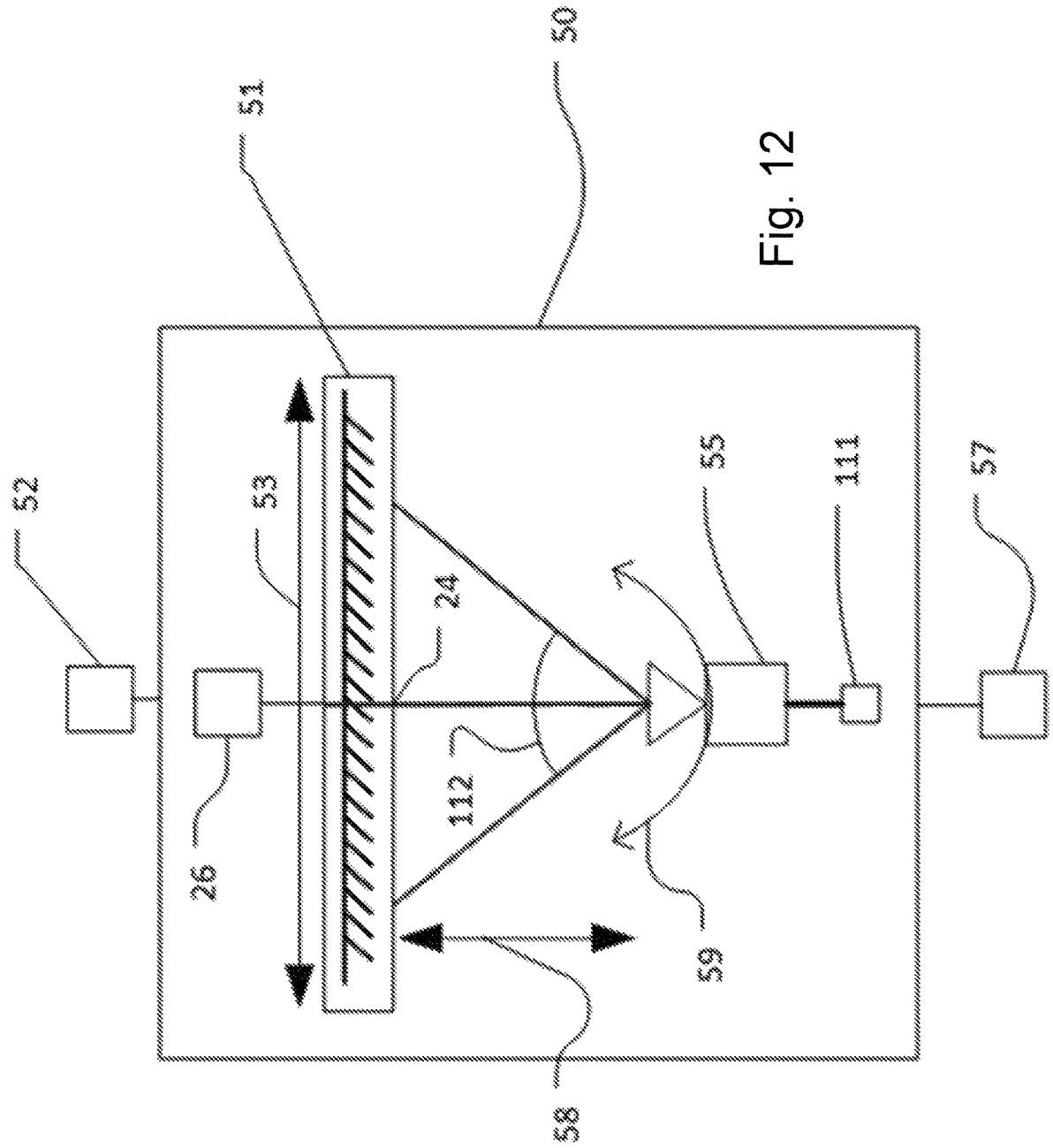
FIG. 12 is a top view of the present invention.
Figure 13:
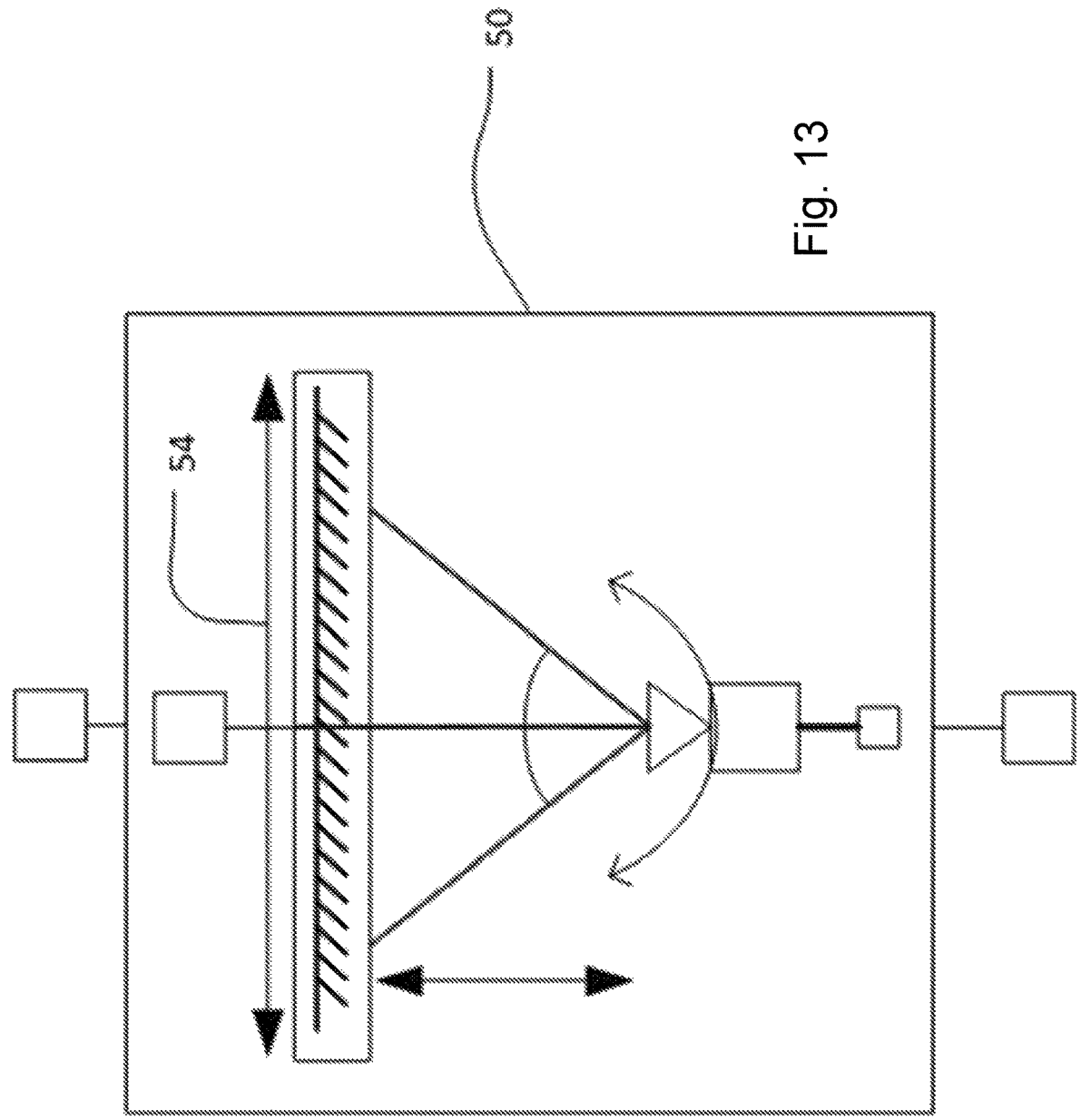
FIG. 13 is a side view of the present invention.

Displays a single output image to a display device, from a single input image, where the output image is aligned with the screen plane normal; and the input image is aligned with the eye plane normal FIG. 12 illustrates a top view of a Mono Recapture Unit (50) which uses a center input image (52) to render a output image (57) which appears flipped horizontally and vertically. It is faster than standard flipping mechanisms because it does not require any per-pixel processing of the image. If magnification is required, the output image (57) is a scaled version of the input image (52). Internally, the Mono Recapture Unit (50) is comprised of recapture display (51) and a recapture camera (55). The recapture display (51) is placed at a position equal to the viewer's center eye (72) and the recapture camera is placed at a recapture distance (115), on a rotation (59) and using a field of view (112). When the recapture unit is running, the value from the input image (52) is assigned to the input image (26) for the recapture display (51). The output image (111) from the recapture camera (55) is assigned to the output image (57) for the Mono Recapture Unit (50). FIG. 13 illustrates a side view of a Mono Recapture Unit (50), showing the display height (54) of the recapture display in relation to elements described in FIG. 12.

The mono recapture unit can have a number of variations, including 1. Display surface shape; and. Magnification level.

7. Field of View

The field of view maintains a list of angles, which are used within the display process. This encapsulates the coordinates required for a recapture unit to produce an output image.

Figure 8:
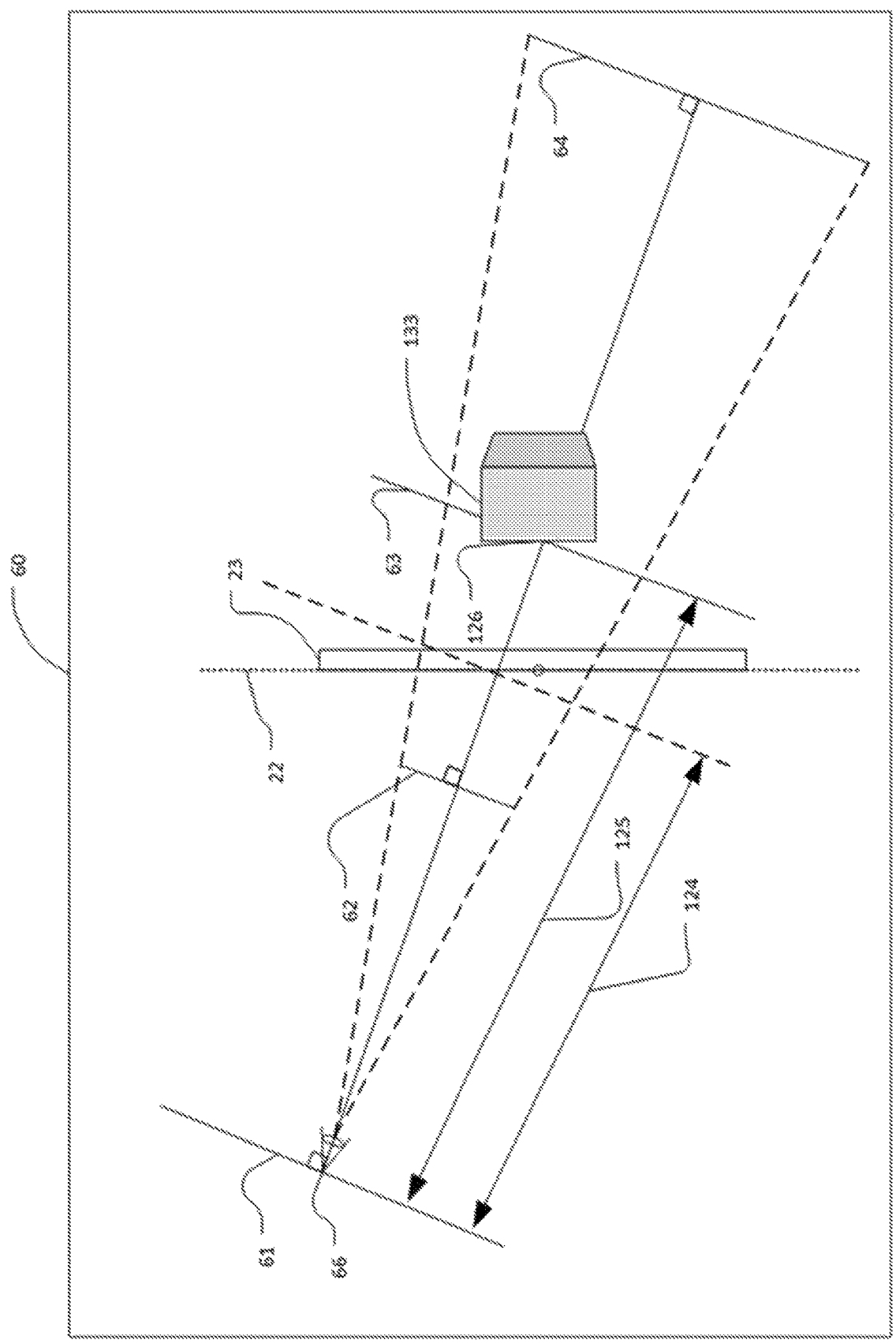
FIG. 8 is a top view of the present invention.

FIG. 8 illustrates a representation of a Field of View (60) which is used by an Eye (120) and Camera (110). In this illustration, the Field of View (60) is representative of an Eye (120) looking through a display surface (23) at a scene subject (133). It uses the Eye (120)'s focus point (126) and is placed at a position (66). FIG. 8 shows some key variables used to display an image to the viewer, such as an eye plane (61), eye position (66), eye to display surface distance (124), focal length (125), near plane (62), display plane (22), focal plane (63) and far plane (64).

8. Head

A representation of a human head to model the coordinates of the eyes, such that the positions of both eyes may be calculated based on the head.

Structural and Functional Variations—1. Mono—center; 2. Stereo—L&R.

9. Recapture Space

The recapture units operate in the recapture space.

Figure 9:
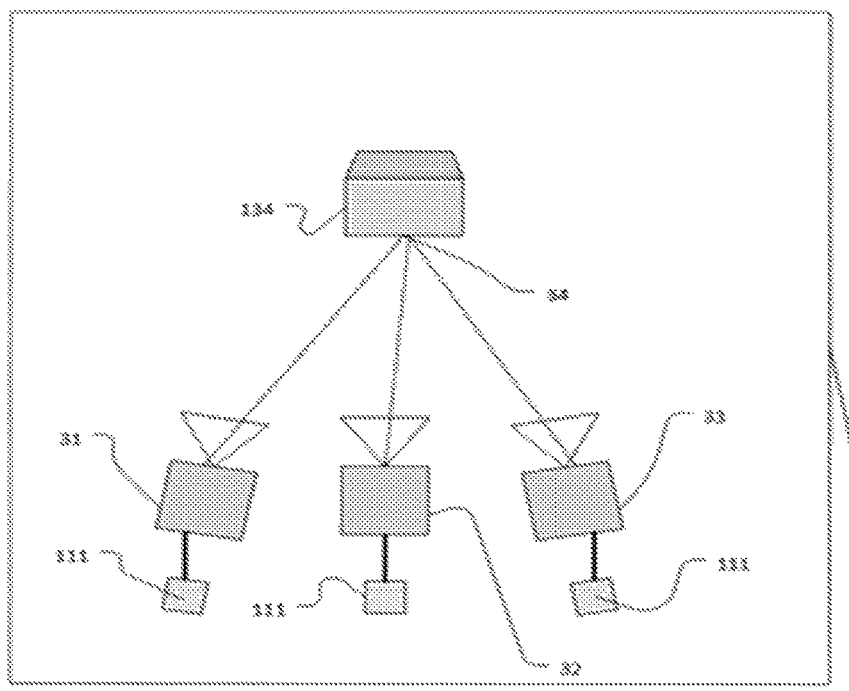
FIG. 9 to FIG. 11 is a top view of the present invention.
Figure 10:
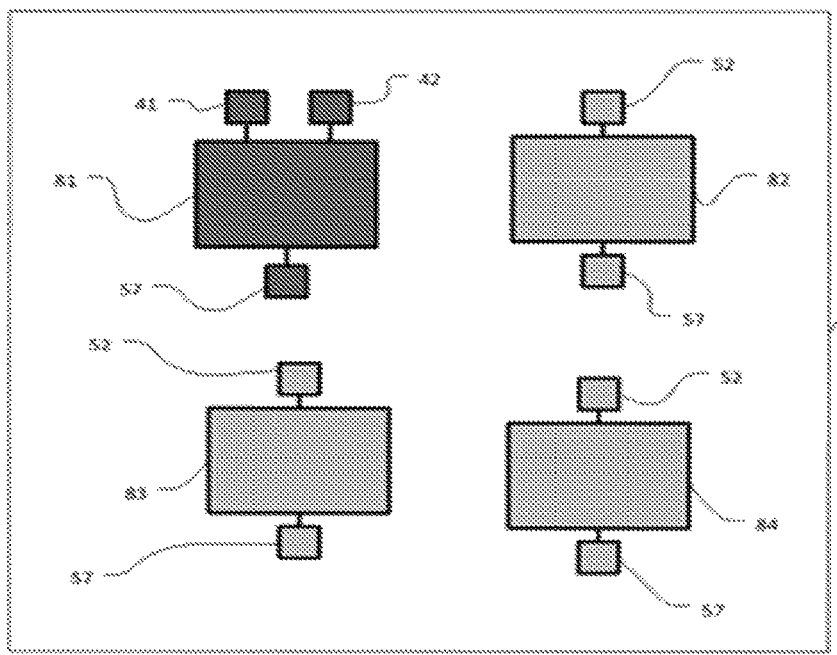
Figure 11:
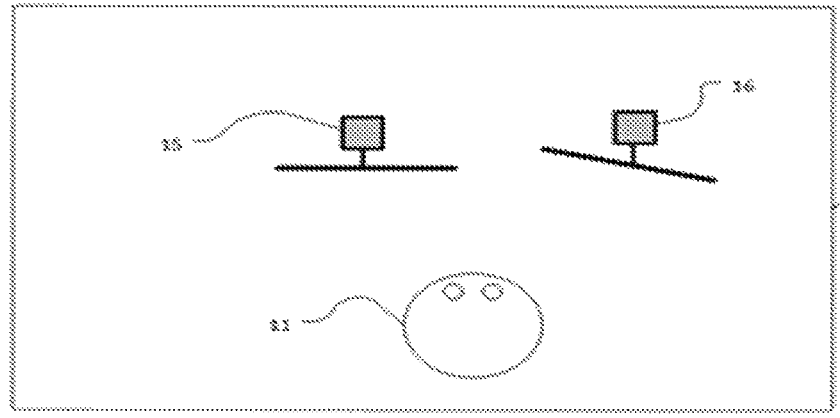

FIG. 9 to FIG. 11 illustrate major elements used to display an image to the viewer, including a Camera Vehicle (30), a Recapture Space (80) and a Viewing Space (10).

As shown in FIG. 9, the Camera Vehicle (30) produces output images (111) for each of the left, center and right cameras (31, 32, 33).

As shown in FIG. 10, the Recapture Space (80) uses the output images (111) from the Camera Vehicle (30) as input for the left and right input recapture units (81 and 82); the input recapture units (81 and 82) are used as input for the output recapture units (83 and 84), placing images in their output image (57).

As shown in FIG. 11, the left and right display devices (15 and 16) in the Viewing Space (10) use the output recapture units (83 and 84) as input and display the output image (57)'s to the viewer (11).

A number of Structural and Functional Variations are possible including: 1. Mono; 2. Stereo; and 3. Dual.

10. Recapture Space Connections

To connect the recapture units in the recapture space a recapture space connection is provided.

Figure 16:
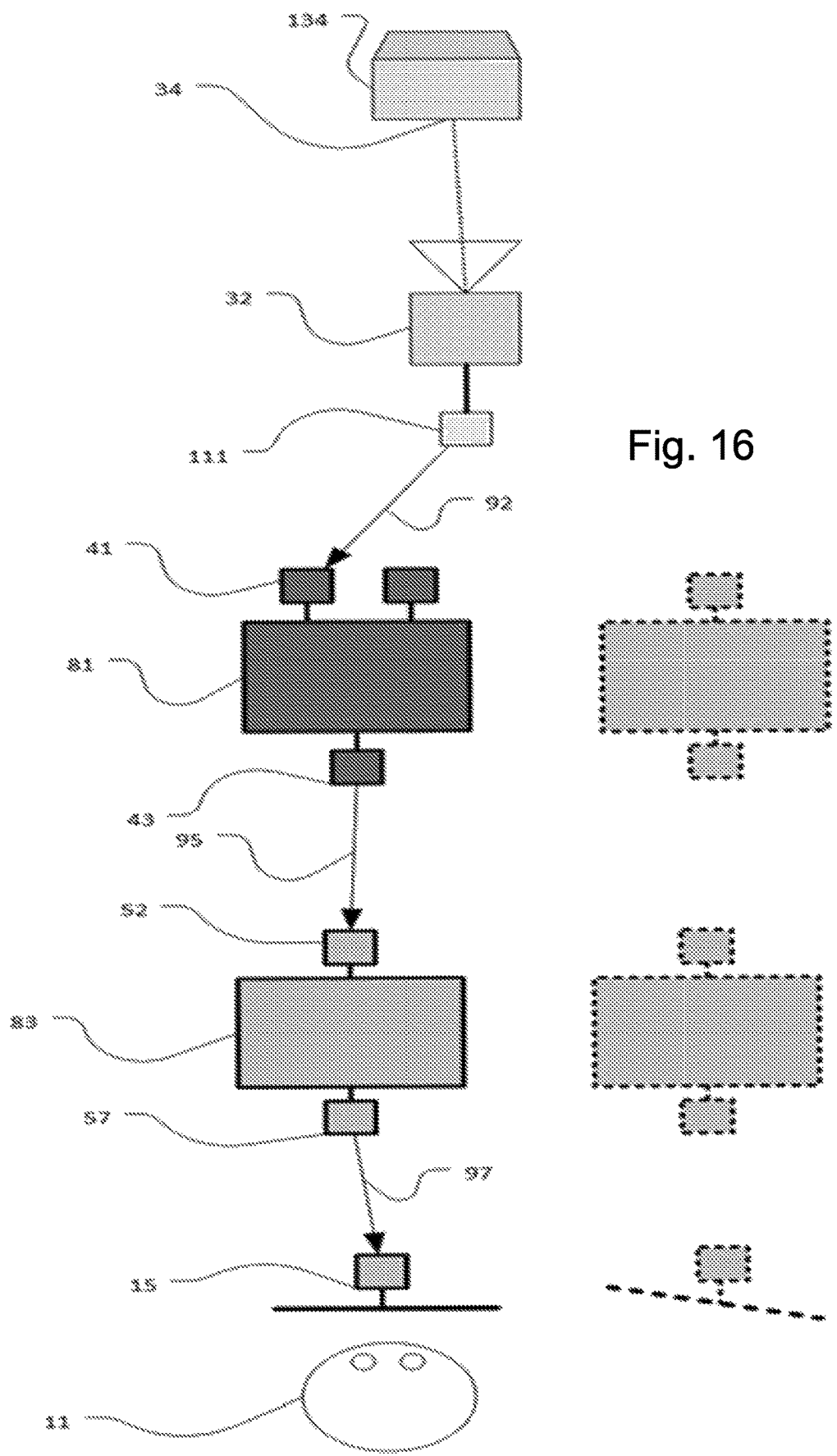
FIG. 16 is a flowchart illustrating a sub-operation of the present embodiment.

FIG. 16 illustrates the Recapture Space configured for a mono display process; which connects the center camera (32) to the left input recapture unit (81) via connection (92); the left input recapture unit (81) to the left output recapture unit (83) via (95); the left output recapture unit (83) to the viewer's display device (15) via connection (97); so that the viewer (11) can see the output image (111) of the center camera (32).

Figure 17:
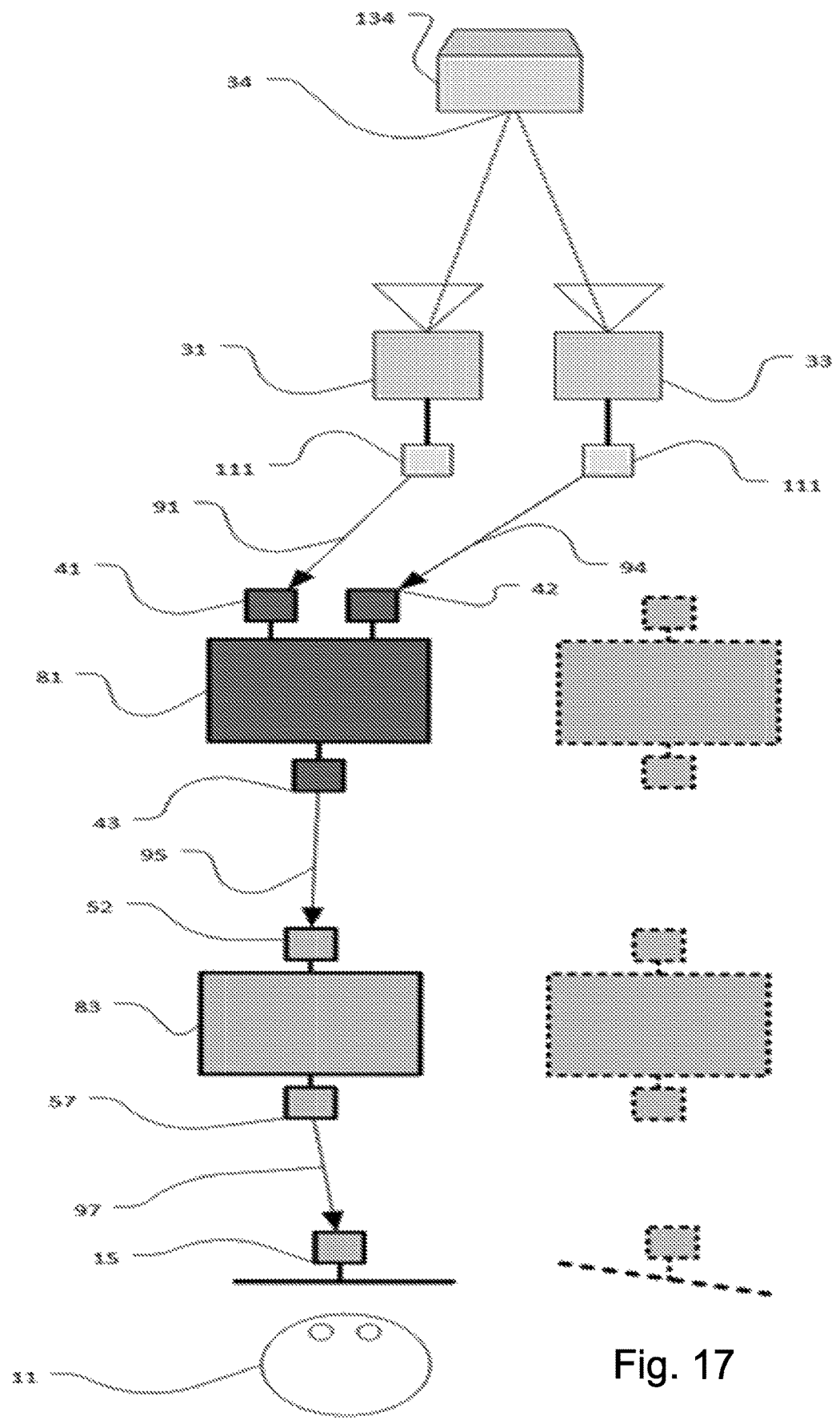
FIG. 17 is a flowchart illustrating a sub-operation of the present invention.

FIG. 17 illustrates the Recapture Space (80) configured for the stereo display process; which connects: the left camera (31) to left input (41) of the left input recapture unit (81) via connection (91); the right camera (33) to right input (42) of the left input recapture unit (81) via connection (94); the left input recapture unit (81) to the left output recapture unit (83) via (95); the left output recapture unit (83) to the viewer's display device (15) via connection (97); so that the viewer (11) can see the output image (111) of the left and right cameras (32 and 33).

Figure 18:
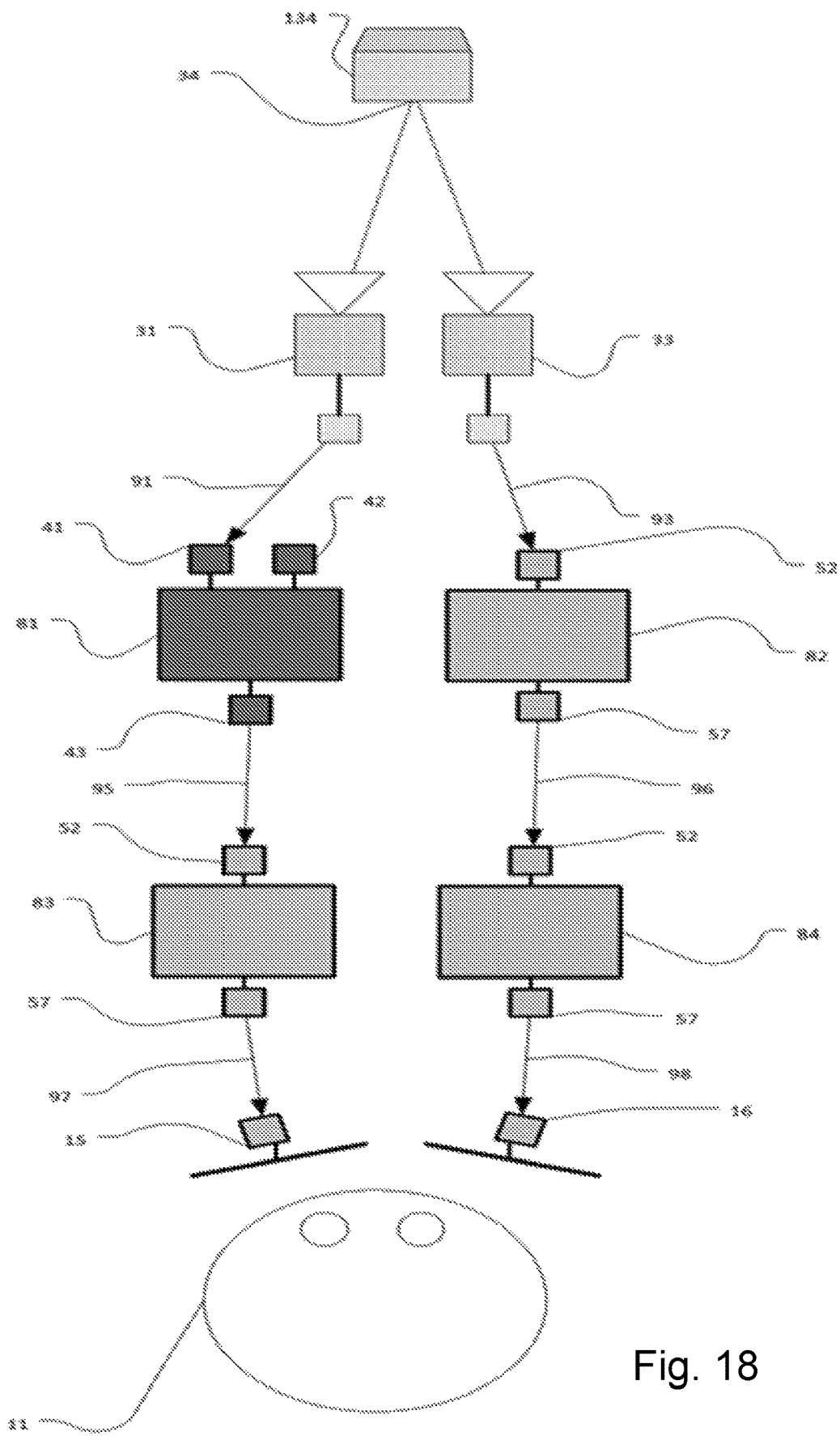
FIG. 18 is a flowchart illustrating a sub-operation of the present invention.

FIG. 18 illustrates the Recapture Space (80) configured for the dual display process; which connects: the left camera (31) to left input (41) of the left input recapture unit (81) via connection (91); the right camera (33) to input image (52) of the right input recapture unit (82) via connection (93); the left input recapture unit (81) to the left output recapture unit (83) via connection (95); the right input recapture unit (82) to the right output recapture unit (84) via connection (96); the left output recapture unit (83) to the viewer's display device (15) via connection (97); the right output recapture unit (84) to the viewer's right display device (16) via connection (98); so that the viewer (11) can see the output image (111) of the left and right cameras (32 and 33).

11. Image Set

A list of images is maintained for use for the display process.

Figure 19:
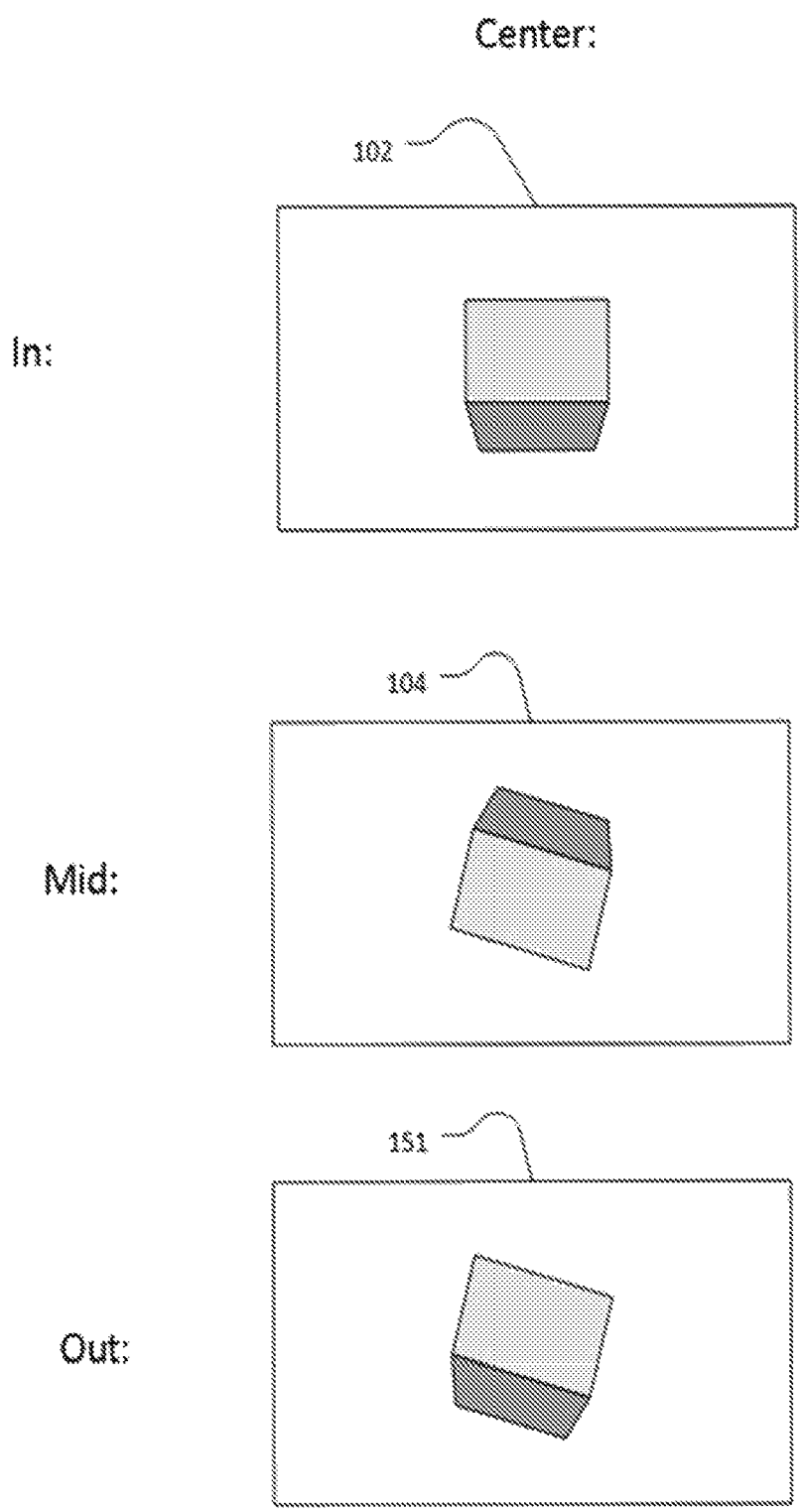
FIG. 19 is a front view of the present invention.

FIG. 19 illustrates an example Image Set for the Mono Process, including images named "Center Camera In" (102); "Mono Middle Center" (for mono) (104) and "Mono center out" (for mono) (108).

Figure 20:
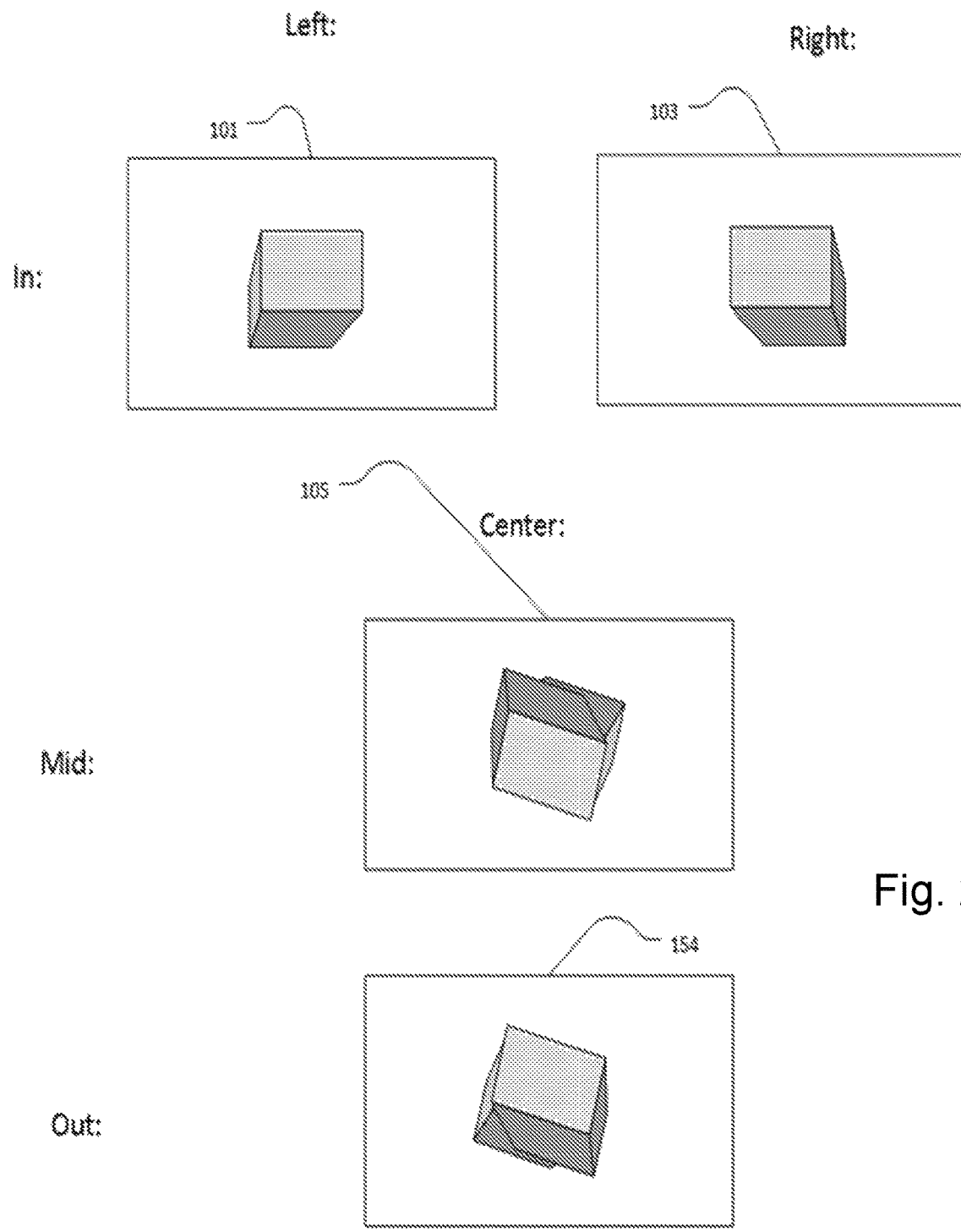
FIG. 20 is a front view of the present invention.

FIG. 20 illustrates the Image Set for the Stereo Process, including images named "Left Camera In" (101); "Right Camera In" (103); "Stereo Middle" (for stereo) (105) and "Stereo out" (for stereo) (154).

FIG. 22 illustrates the Image Set for the Dual Process, including images named "Left Camera In" (101); "Right Camera In" (103); "Mono middle left" (for dual) (106); "Mono middle right" (for dual) (107); "Mono left out" (for dual) (151) and "Mono right out" (for dual) (152).

Structural and Functional Variations include: 1. Mono; 2. Stereo; 3. Dual.

12. Camera

The camera maintains a field of view, position and rotation and capture an image.

FIG. 1 illustrates a representation of a Camera (110) that produces an output image (111). The Camera (110) has a field of view (112), position (113) and rotation (114).

Structural and Functional Variations include: 1. Mono—center.; 2. Stereo—L&R.

13. Eye

A representation of a human eye(s), the coordinates of the eye(s) are used to maintain a field of view, position and rotation and calculate the eye plane angles.

14. Content Space

To display a 3D scene, a virtual space can be displayed on the display surface.

Figure 6:
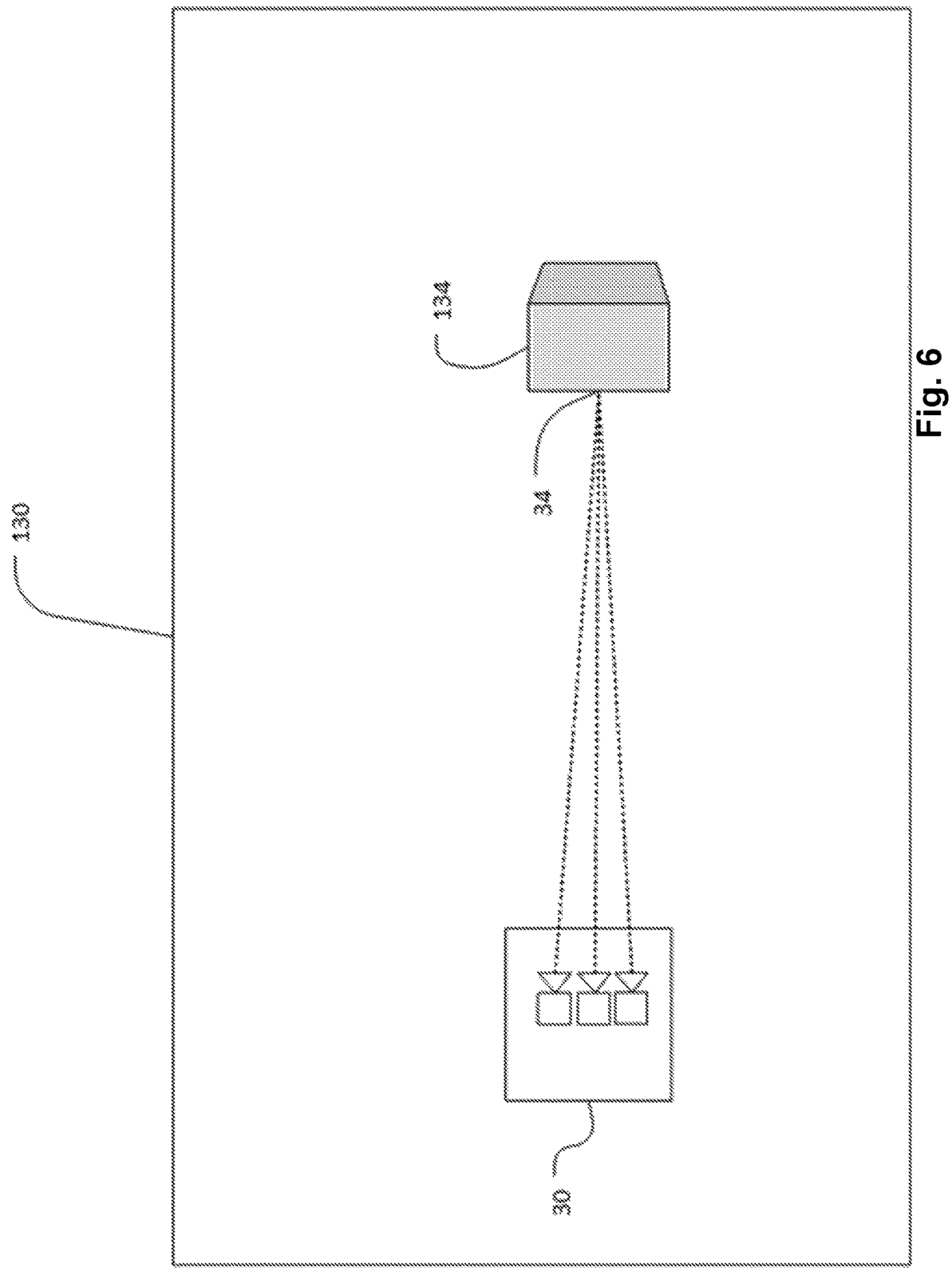
FIG. 6 is a top view of the present invention.

FIG. 6 illustrates a Content Space (130) comprising of a Camera Vehicle (30) and a scene subject (134). The focus point (34) for the Camera Vehicle (30) is placed on the scene subject (134) so that left (31), center (32) and right cameras (33) capture left input (101), center input (102) and right input image (103)'s may be captured for the display process.

Figure 7:
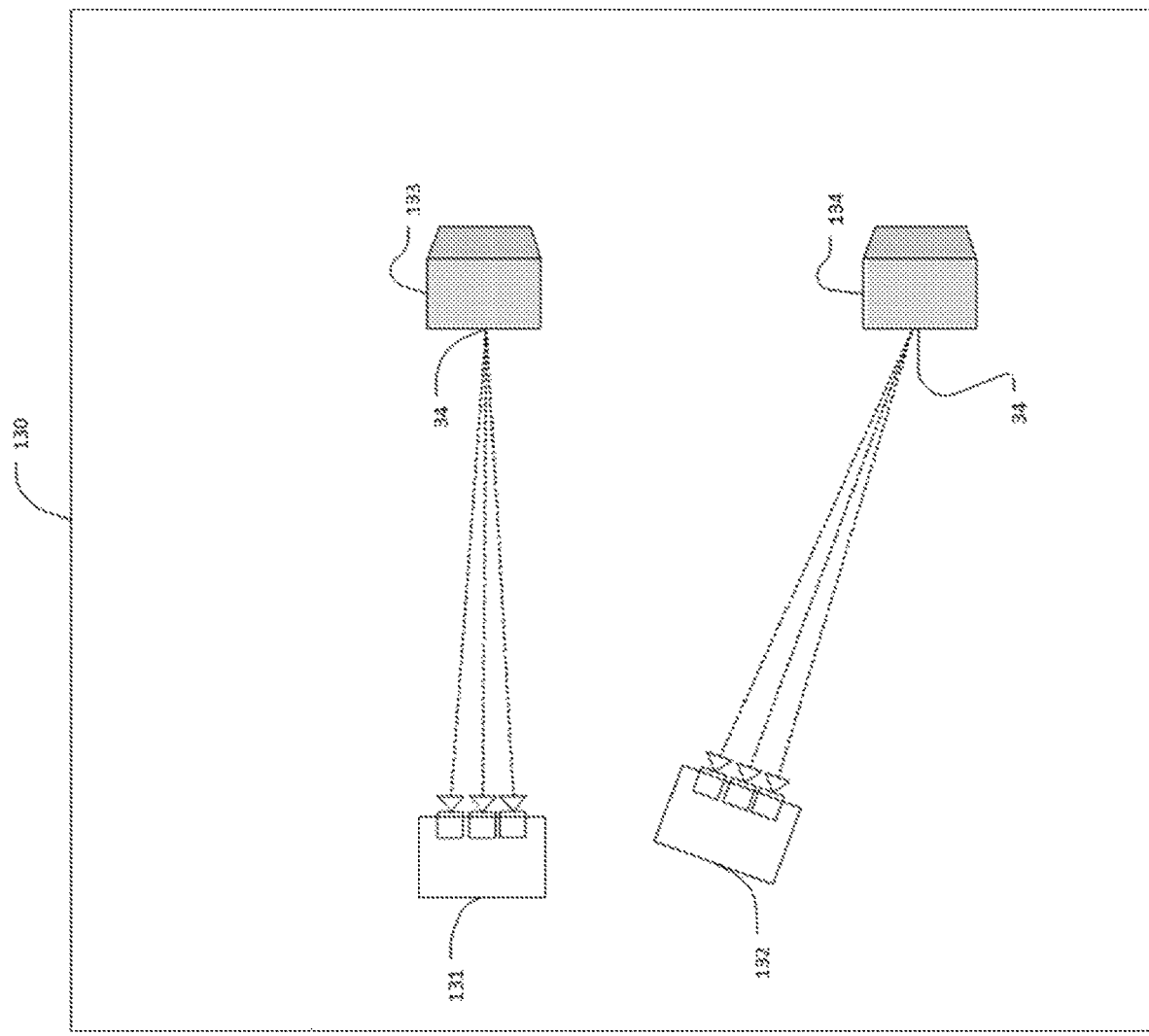
FIG. 7 is a top view of the present invention.

FIG. 7 illustrates a Content Space (130) with multiple viewers. Each viewer is provided with a Camera Vehicle (30), which is used to capture input images for the display process for their respective display device (15 or 16). Viewer 1 (141) uses viewer camera vehicle (131) to view scene subject 1 (133) by placing the Camera Vehicle (30)'s focus points (34) on the scene subject (133); Viewer 2 (142) uses viewer camera vehicle (132) to view scene subject 2 (134) by placing the Camera Vehicle (30)'s focus points (34) on the scene subject (134).

15. Room Space

To manage the viewing spaces, viewers, and display devices within a physical space use a Room Space.

Figure 5:
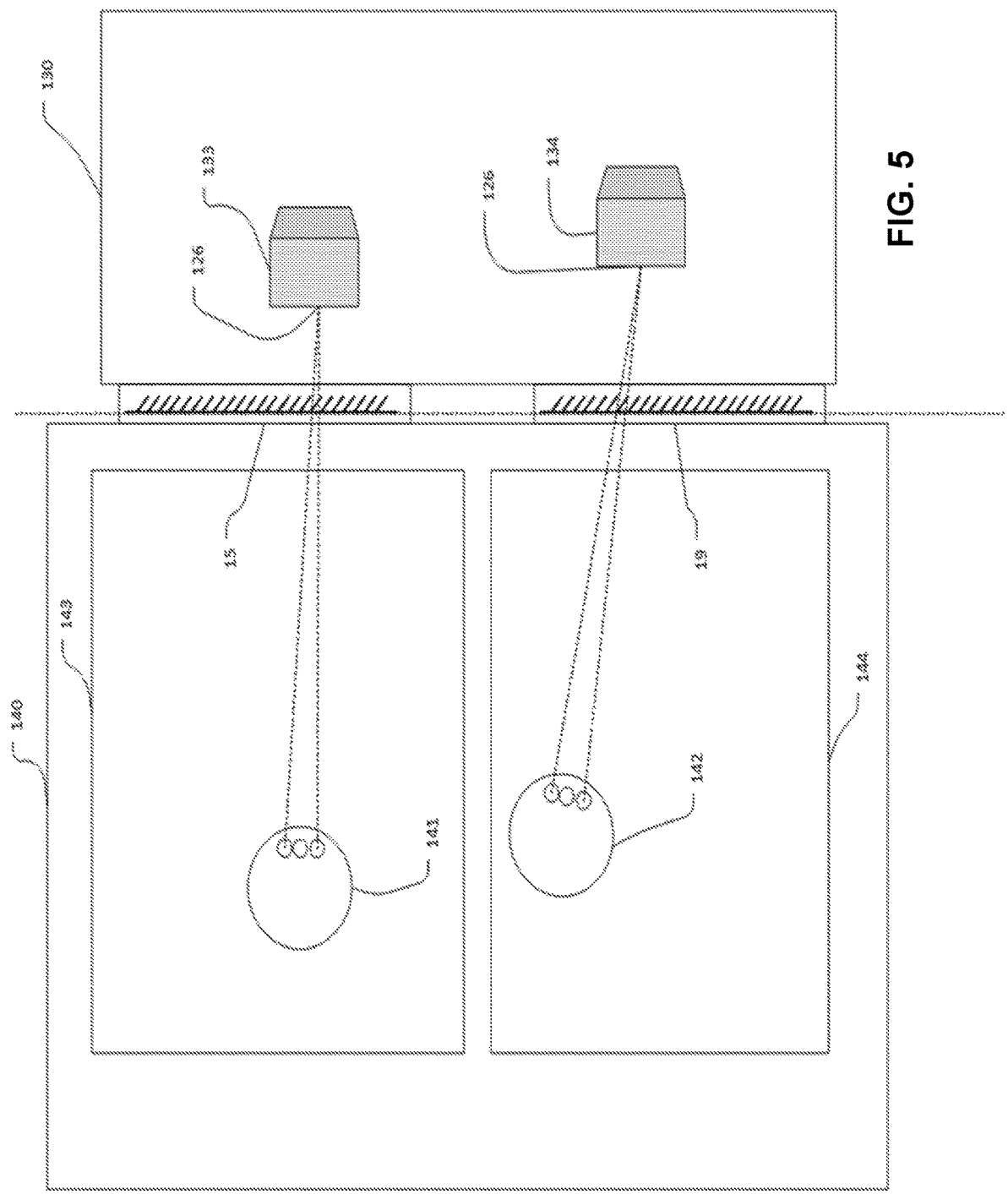
FIG. 5 is a top view of the present invention.

FIG. 5 illustrates a Room Space (140) when used by multiple viewers with individual viewing spaces. It shows viewer 1 (141) using viewing space 1 (143) with a display device (15); viewer 2 (142) using viewing space 2 (144) with a second display device (19); where each viewer (11) is looking at a display device (20) in a Content Space (130)

with a focus point (126) each, placed on scene subject 1 (133) and scene subject 2 (134) for Viewer 1 (141) and Viewer 2 (142) respectively.

Each viewer (141 and 142) and display device (15 and 19) has its own Recapture Space.

16. Output Image Set

To maintain images to be displayed to the viewer there is an output image set.

FIG. 19 shows the images used in the mono process; "Mono Center Out" (151) is the result of the mono display process for the input images illustrated by "center camera in" (102).

FIG. 20 shows the images used in the stereo process; "Stereo Out" (154) is the result of the stereo display process for the input images illustrated by "left camera in" (101), "right camera in" (103) for stereo.

Figure 21:
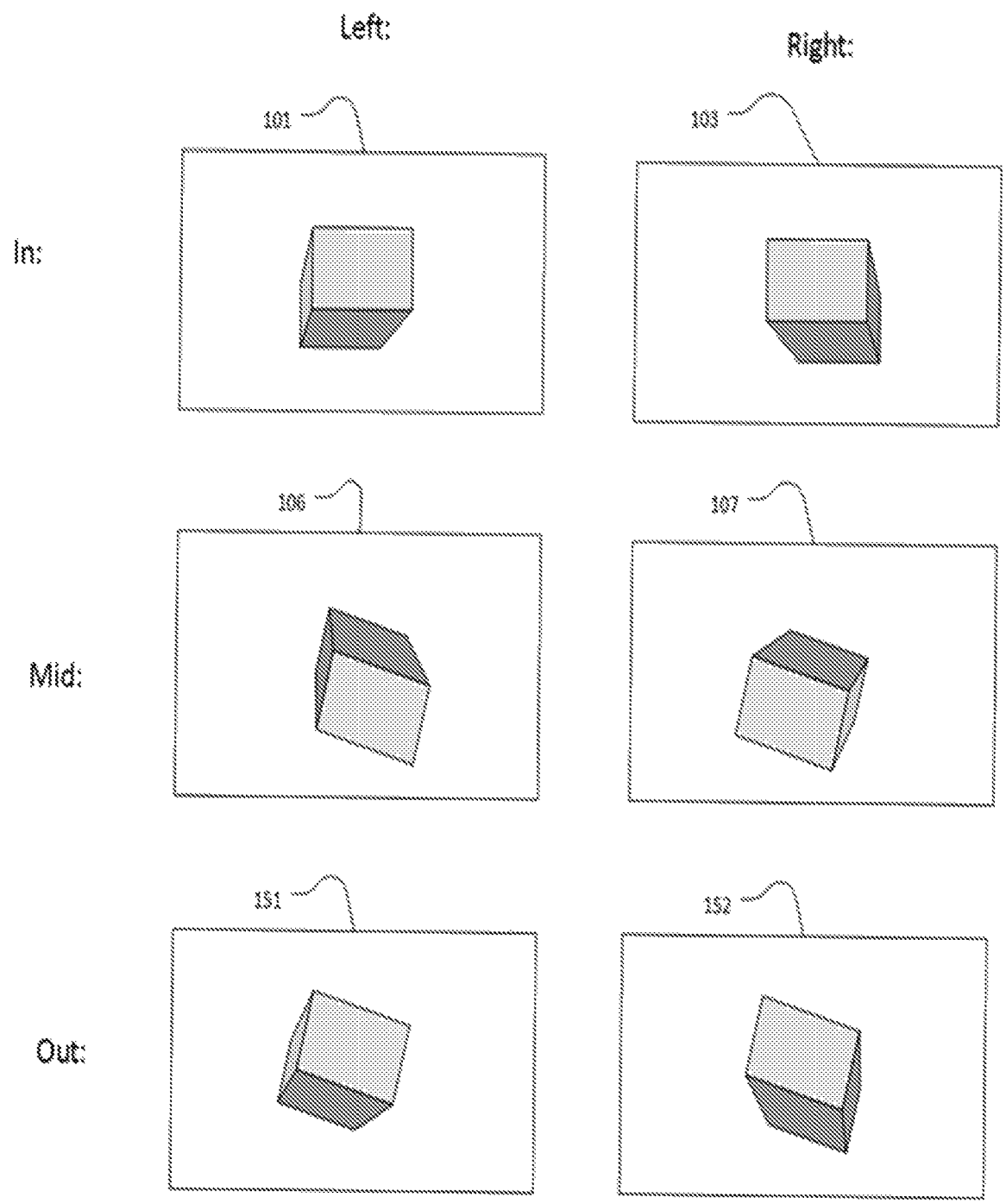
FIG. 21 is a front view of the present invention.
Figure 25:
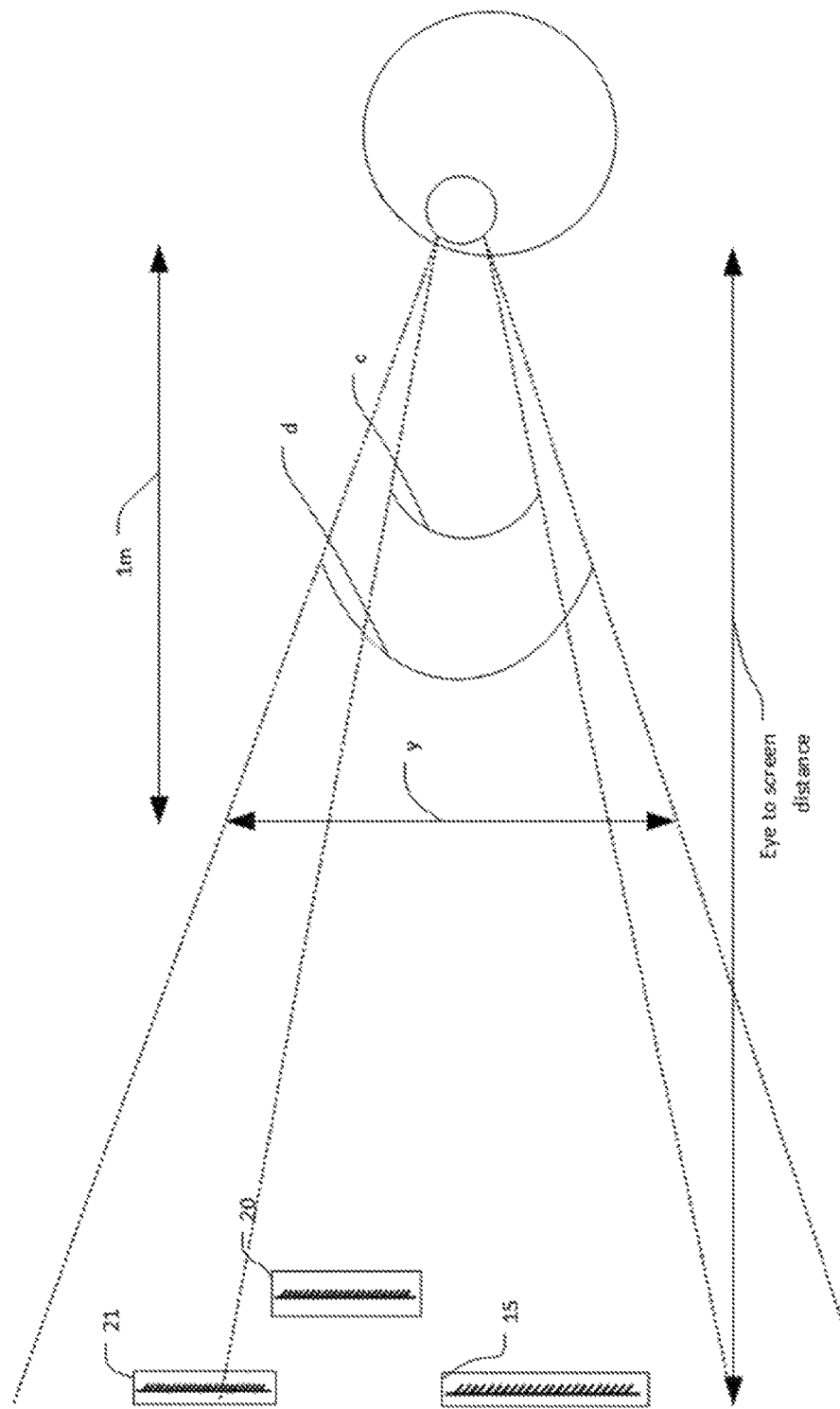
FIG. 25 illustrates the process of calculation of the field of view for multiple display devices.
Figure 26:
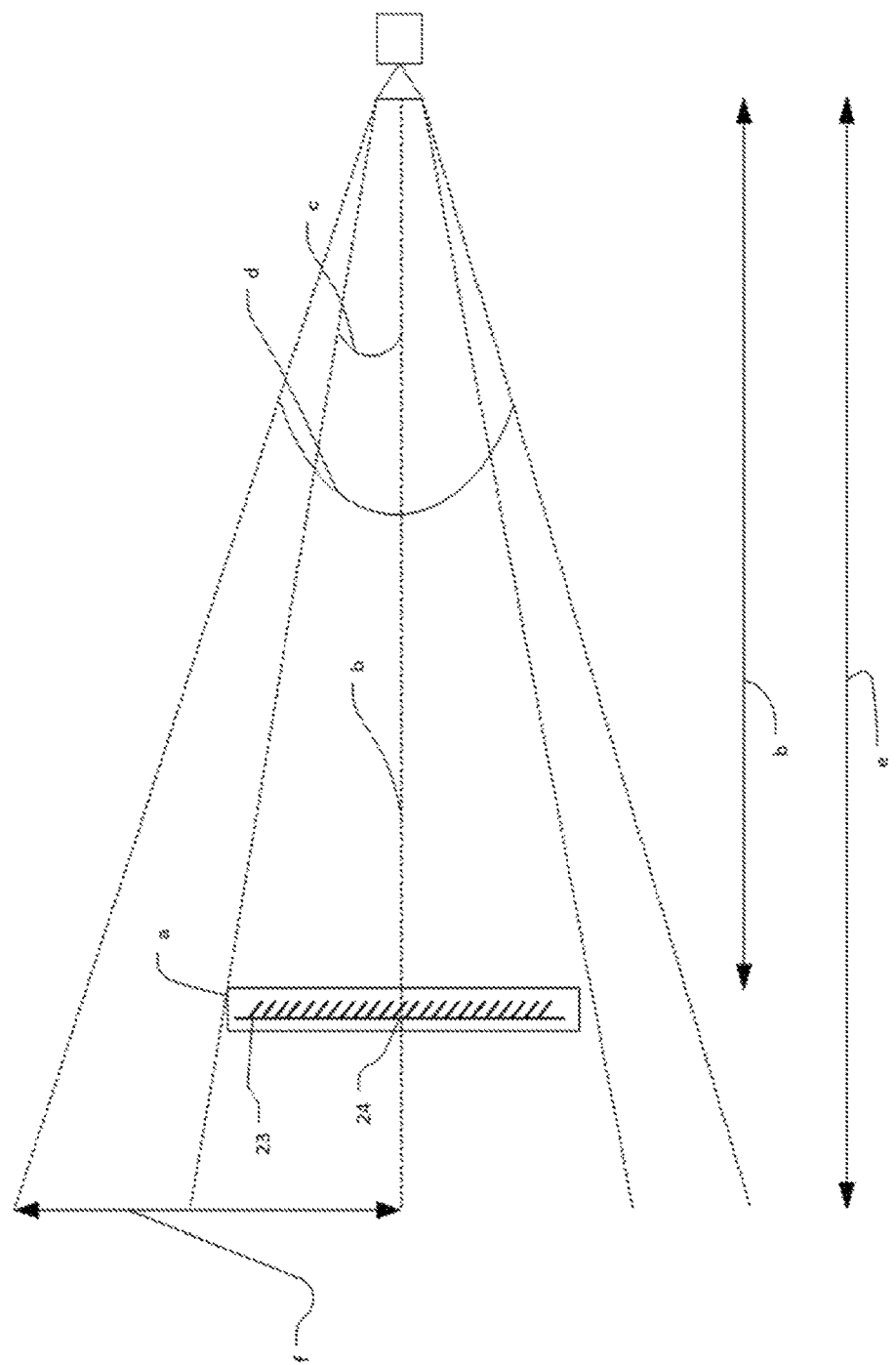
FIG. 26 illustrates the process of calculation for a single display.

FIG. 21 shows the images used in the dual process; "Mono Left Out" (151) and "Mono Right Out" (152) is the result of the dual display process for the input images illustrated by "left camera in" (101), "right camera in" (103) for dual.

17. Connections of Main Elements and Sub-Elements

The Viewing Space (10) encapsulates the viewer (11) looking through a Display Device (20), into a Content Space (130), focusing on a scene subject (133) with a focus point (126), in order to superimpose the coordinates of the viewer's head (70) and focus point (74) on the Camera Vehicle (30) in the Content Space (130). The focus point (34) in the Content Space (130) includes the eye's focus point (126). The relative coordinates between the viewer (11) and the Display Device (20) are supplied to the recapture units in the Recapture Space (80), which produces images where the viewer's focus point is preserved.

The Recapture Units (40, 50) then process the images, captured by the Camera Vehicle (30) in the Content Space (130), for display in the Display Device (20), in the Viewing Space (10). The resulting image should look overlapped and obscured when focusing on the display plane and aligned when focused on the focal point.

Operation of Preferred Embodiment

The Viewing Space (10), Display Device (20), Recapture Space (80), Content Space (130), and Camera Vehicle (30) function together to allow the viewer to change their focal length and be comfortable with the resulting imagery.

The novelty and end result is that the focal point is not on the display plane; and also the display process allows for one to easily split a virtual scene across multiple display devices.

The best mode for multiple viewers on a single display is mono. The best mode for a single viewer on a single display is stereo. The best mode for headset displays is dual, except where the headset has a single display, in which case the mono process should be used.

Operation Process:

Step 1—Viewing Space (10) to model viewer coordinates.

Step 2—Viewer(s) coordinates recorded: including Viewer's Head (70), Position of the left eye (71), center eye (72), right eye (73); Field of View (123) and Eye to display surface distance (124), Focal length (125) and Focus point (126).

Step 3—Viewer coordinates supplied to: Camera Vehicle(s) (30). Viewer(s) coordinates superimposed onto the Camera Vehicle(s) (30), in single or multiple Content Spaces (130); Recapture Unit(s) (80, 81).

Step 4—Recapture Process, Camera Vehicle (30):

1. Rotate and reposition Cameras (110).
2. Capture Image(s): Stereo and Dual—Take two images from positions equivalent to the viewer's left eye (71) and right eye (73) with a Field of View (60) of 140 degrees. Mono—Take one image from the position of the center eye (72). The center eye (72) is calculated as a position half-way between the viewer's (11) left eye (71) and right eye (73).

Step 5—Recapture Process, Input Recapture Unit(s) (80, 81).

1. Display 'in' images from the Camera Vehicle (30) upside down and back to front.
2. Capture 'mid' images.
3. Send 'mid' image(s) to Output Recapture Unit(s).

Step 6—Output Recapture Unit(s) (83,84).

1. Display 'mid' image(s) from Input Recapture Unit(s) by displaying the image on a double-sided surface; and positioning the camera behind the surface and upside down before capturing an image.
2. Position the recapture camera(s) behind the surface and then alter it forward or backward to increase or decrease desired the magnification level of 'out' images.
3. Capture the 'out' images.
4. Send final result ('out' image(s)) to the display device(s).

Operation Process Reference Figures:

FIG. 5 shows what the viewer appears to perceive.

FIG. 6 shows the content being captured.

FIGS. 22, 23 and 24 show an overview of the configuration for mono, stereo and dual, respectively.

FIGS. 16, 17 and 18 show the connectivity from the content space to the viewer for mono, stereo and dual, respectively.

FIGS. 19, 20 and 21 shows the imagery used by the process for mono, stereo and dual, respectively.

Turning to FIG. 27, the embodiments allow for the curvature of display devices. As such, the invention's recapture process allows for the following variables when the viewer's display device (15, 16) is curved. 1) If 15 is curved, 51 and 81 must use opposite curvature. 2) If 15 is curved, 51 and 83 must use curvature. 3) If 16 is curved, 51 and 82 must use opposite curvature. 4) If 16 is curved, 51 and 84 must use curvature.

The embodiments therefore provide a camera projection technique for displaying imagery on a display surface, with the viewers focus point being in front or behind the display surface. The camera projection technique generally includes include: a Camera (110) to maintain a field of view, position, rotation and capture an image; a Camera Vehicle (30) to transport cameras; a Display Device (20) to output images; a Viewing Space (10) to model viewer(s) coordinates; a Head (70) to model the coordinates of the eyes, such that the positions of both eyes may be calculated based on the head; an Eye (120) to maintain a field of view, position and rotation and calculate the eye plane angles; a Field of View (60) to maintain a list of angles, which are used within the display process; a Room Space (140) to manage the viewing spaces, viewers, and display devices within a physical space; a Recapture Space (80) to place recapture units and render output images for the viewer; a Stereo Recapture Unit (40) to display left and right images on a particular angle, and capturing them upside down and back to front; a Mono Recapture Unit (50) to display an image on a particular angle, and capturing it upside down and back to front; Recapture Space Connections (90) to connect the recapture units in the recapture space; a Content Space (130) to display a 3D scene; an Image Set (100) to maintain the list of images used for the display process; Output Image Set (150) to maintain images to be displayed to the viewer.

INTERPRETATION

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

INDEX OF ELEMENTS

- 10: Viewing Space
- 11: Viewer's Head (70)
- 12: Display Space
- 15: Viewer's Left Or Current Display Device (20)
- 16: Viewer's Right Display Device (20)
- 19: Display Device 2 (20)
- 20: Display Device
- 22: Display Plane
- 23: Display Surface
- 24: Center Point
- 26: Input Image
- 30: Camera Vehicle
- 31: Left Camera (110)
- 32: Center Camera (110)
- 33: Right Camera (110)
- 34: Focus Point
- 40: Stereo Recapture Unit
- 41: Left Input Image
- 42: Right Input Image
- 43: Output Image
- 44: Left Recapture Display (20)
- 45: Right Recapture Display (20)
- 46: Recapture Camera (110)
- 50: Mono Recapture Unit 51: Recapture Display (20)
52: Input Image
53: Display Width
54: Display Height
55: Recapture Camera (110)
57: Output Image
58: Magnification Distance
59: Recapture Camera Rotation
60: Field of View
61: Eye Plane
62: Near Plane
63: Focal Plane
64: Far Plane
66: Position (121)
70: Head
71: Left Eye (120)
72: Center Eye (120)
73: Right Eye (120)
74: Focus Point
80: Recapture Space
81: Left Input Recapture Unit (stereo Recapture Unit (40))
82: Right Input Recapture Unit (mono Recapture Unit 50))
83: Left Output Recapture Unit (mono Recapture Unit (50))
84: Right Output Recapture Unit (mono Recapture Unit (50))
90: Recapture Space Connections
91: Left Input Camera To Left Input Recapture Unit
92: Center Input Camera To Left Input Recapture Unit
93: Right Input Camera To Right Input Recapture Unit
94: Right Input Camera To Left Input Recapture Unit (for Stereo Mode)
95: Left Input Recapture Unit To Left Output Recapture Unit
96: Right Input Recapture Unit To Right Output Recapture Unit
97: Left Output Recapture Unit To Display Device
98: Right Output Recapture Unit To Right Display Device
100: Image Set
101: Left Camera In
102: Center Camera In
103: Right Camera In
104: Mono Middle Center (for Mono)
105: Stereo Middle (for Stereo)
106: Mono Middle Left (for Dual)
107: Mono Middle Right (for Dual)
110: Camera
111: Output Image
112: Field of View
113: Position
114: Rotation
115: Recapture Distance
120: Eye
121: Position
122: Rotation
123: Field of View (60)
124: Eye To Display Surface Distance
125: Focal Length
126: Focus Point
130: Content Space
131: Viewer 1 Camera Vehicle (30)
132: Viewer 2 Camera Vehicle (30)
133: Scene Subject 1
134: Scene Subject 2
140: Room Space
141: Viewer 1
142: Viewer 2
143: Viewing Space 1 (10)
144: Viewing Space 2 (10)
150: Output Image Set
151: Mono Left Out (for Dual)
152: Mono Right Out (for Dual)
153: Mono Centre Out (for Mono)
154: Stereo Out (for Stereo)

The invention claimed is:

1. A method of displaying imagery on a display surface so as to provide for a viewer's focus on an object in front or behind the display surface, the method including the steps of:
    determining the head position of the viewer, including the eye coordinates of both viewer's eyes;
    capturing the imagery to be displayed via a camera capture system, including capturing a first right eye image captured on a first plane and a second left eye image, captured on a second plane, with the two planes being rotationally offset from one another, and corresponding to the eye coordinates of both the viewers eyes;
    rendering an image on the display surface, including a first plane image corresponding to the first right eye image captured on the first plane, and a second left eye image captured on the second plane, with the two planes being rotationally offset from one another, corresponding to the eye coordinates of both of the viewers eyes.

2. A method as claimed in claim 1, further comprising modifying the rendered image to account for the planar nature of a display device.

3. An imaging system including:
    a camera device to capture a scene image, in addition to a field of view, position, and rotation, the camera device further including: left, center and right image capture devices to capture and output a corresponding left eye, right eye and a middle of eye scene image;
    a display device to output corresponding scene images captured by the camera;
    a viewing space unit to detect and model a viewer coordinates relative to the display, including head and eye coordinates, including eye rotation, field of view and eye plane angles; and
    an output recapture unit, for mapping the captured scene image to the display device; the output recapture unit includes a stereo to mono recapture unit including first right and left display devices for displaying right and left images as captured by the camera device, which are then imaged by a third camera to create an output image for display by said display device.

4. An imaging system as claimed in claim 3, wherein said camera device is mounted on a camera vehicle for transportation.

5. An imaging system as claimed in claim 3, wherein the first right and left display devices are offset in the plane relative to one another.

6. An imaging system as claimed in claim 3, wherein the output recapture unit further operates as a single image capture unit, displaying the image from only the first right or left display device.

7. A method as claimed in claim 1, further comprising capturing imagery utilizing a center image capture device.

8. A method as claimed in claim 7, further comprising rendering an image on the display device utilizing the center image capture device.

\* \* \* \* \*